US008205085B2

(12) United States Patent
Yao

(10) Patent No.: US 8,205,085 B2
(45) Date of Patent: Jun. 19, 2012

(54) KEY UPDATE SYSTEM, KEY MANAGEMENT DEVICE, COMMUNICATION TERMINAL, AND KEY INFORMATION CONSTRUCTION METHOD FOR MULTIHOP NETWORK

(75) Inventor: Taketsugu Yao, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1370 days.

(21) Appl. No.: 11/637,066

(22) Filed: Dec. 12, 2006

(65) Prior Publication Data

US 2007/0140480 A1     Jun. 21, 2007

(30) Foreign Application Priority Data

Dec. 20, 2005   (JP) ................................. 2005-366709

(51) Int. Cl.
*H04L 9/32* (2006.01)
*H04L 9/00* (2006.01)
*H04L 9/06* (2006.01)

(52) U.S. Cl. ........................... 713/171; 380/45; 380/277

(58) Field of Classification Search ........................ None
See application file for complete search history.

(56) References Cited

U.S. PATENT DOCUMENTS

| 7,043,024 | B1 * | 5/2006 | Dinsmore et al. | ............. | 380/278 |
| 2005/0018853 | A1 * | 1/2005 | Lain et al. | ..................... | 380/277 |
| 2006/0193473 | A1 * | 8/2006 | Fu | ................................. | 380/277 |

FOREIGN PATENT DOCUMENTS

| JP | 06-318939 | 11/1994 |
| JP | 2004-253885 | 9/2004 |

OTHER PUBLICATIONS

Lazos, L. et al., "Cross-layer Design for Energy-efficient Secure Multicast Communications in Ad Hoc Networks", Proceedings IEEE International Conference in Communications ICC'04, Jun. 2004, Vo. 6, pp. 3633-3639.*
Lozos, L. et al., "Cross-layer Design for Energy-efficient Secure Multicast Communications in Ad Hoc Networks", Proceedings IEEE International Conference in Communications ICC'04, Jun. 2004, vol. 6, pp. 3633-3639.
Suga, Y. et al., "Access Control Method Having Hierarchical Structure Using One-way Hash Funcion", Computer Security Symposium 2003, Information Processing Society of Japan, Oct. 2003, vol. 2003, pp. 293-300.
Adrian Perrig and J.D. Tygar's "Secure Broadcast Communication in Wired and Wireless Networks", pp. 120-123, Translation Supervisor Mizoguchi Fumio, Kyoritsu Shuppan Co., Ltd.

* cited by examiner

*Primary Examiner* — Nathan Flynn
*Assistant Examiner* — Trang Doan
(74) *Attorney, Agent, or Firm* — Rabin & Berdo, P.C.

(57) ABSTRACT

The invention provides a key update system for a multihop network system including an authentication management device that manages keys using a hierarchical structure. That device constructs key information having a hierarchical structure in accordance with the structure of the multihop network. In addition, that device determines respective encryption keys for encrypting the keys based on the key information, and the communication terminals obtain the respective keys. In this system, that device includes a key tree management portion that constructs and manages the key information; an encryption portion that encrypts the keys using the keys included in the key information; and a transmission portion that transmits the encrypted keys. Each communication terminal includes a receiving portion that receives the encrypted keys; a key management portion that manages the keys that need to be held and stored by the given communication terminal; and a decryption portion that decrypts the encrypted keys.

17 Claims, 21 Drawing Sheets

KEY UPDATE SYSTEM, KEY MANAGEMENT DEVICE, COMMUNICATION TERMINAL, AND KEY INFORMATION CONSTRUCTION METHOD FOR MULTIHOP NETWORK

CROSS REFERENCE TO RELATED APPLICATION

The disclosure of Japanese Patent Application No. JP-A-2005-366709 filed on Dec. 20, 2005 including the specification, drawings and abstract is incorporated herein by reference in its entirety.

BACKGROUND OF THE INVENTION

The present invention relates to a key update system, a key management device, a communication terminal, and a key information construction method for a multihop network. In particular, the present invention relates to a technology that safely updates a key such that a communication terminal of a third party that is not part of the network or a communication terminal that needs to be removed from the network cannot identify the key after it has been updated. In addition, the present invention relates to a technology that safely updates a key such that a communication terminal that newly joins the network cannot identify a key that was previously used.

A multihop network is a network in which one or a plurality of communication terminals relay data communication between any given two communication terminals. The communication system may be wired or wireless.

FIG. 1 shows the normal structure of a multihop network system. The multihop network system includes an authentication management device 100 and a plurality of transmission terminals 110 that are members of the network. The transmission terminals 110 share a network common key K0. In this multihop network, when one of the transmission terminals 110 is removed from the network, or when a new transmission terminal 110 joins the network, the network common key K0 has to be updated to a new common key K0' without the transmission terminals 110 recognizing.

One way of achieving the above objective is to adopt a method using a Logical Key Hierarchy (LKH) key distribution protocol, such as that proposed in Adrian Perrig and J. D. Tygar's "Secure Broadcast Communication in Wired and Wireless Networks", pp. 120-123, Translation Supervisor Mizoguchi Fumio, Kyoritsu Shuppan Co., Ltd. FIG. 21 provides a simple explanation of a LKH key distribution protocol. Hereinafter, key information that has a hierarchical structure associated with a tree structure, which is one type of hierarchical structure, will be referred to as a "key tree". In the LKH key distribution protocol, in order to perform efficient key update, an authentication management device manages the key tree. Each node in the key tree (K0, K1, K2, K3, K4, K5, K6) respectively represents an encryption key for distributing a key. The authentication management device assigns each communication terminal to a leaf of the key tree (meaning a leaf in the tree structure). At this time, each communication terminal learns all of the keys from its own leaf node to the root of the key tree. However, the communication terminal does not learn anything about the other keys in the key tree. The key K0 that is located at the tree root is the network common key that is shared by all of the communication terminals.

Note that, in the case that a communication terminal D1 that is a member of the network needs to be removed from the network, the authentication management device updates, amongst the encryption keys of the key tree that it manages, the keys K0, K1 and K3 that the communication terminal D1 holds. The keys are respectively updated to K0', K1' and K3'. In addition, in order to respectively update the keys K0, K1 that each communication terminal holds to K0', K1', the authentication management device broadcasts the following key update message in which E (X,Y) expresses the meaning that key X is used to encrypt message Y.

E (K4, K1'), E (K1', K0'), E (K2, K0')

Since a communication terminal D2 knows the key K4, the communication terminal D2 can obtain K1' from the key update message. Next, the communication terminal D2 can use the key K1' obtained from the key update message to obtain the new network common key K0'. Further, since the communication terminals D3 and D4 know the key K2, the communication terminals D3 and D4 can obtain the new network common key K0' from the key update message.

On the other hand, the communication terminal D1 does not hold any of the keys needed to decrypt the key update message. Accordingly, the communication terminal D1 is not able to obtain the new key. Thus, as described above, with the LKH key distribution protocol it is possible to efficiently notify all communication terminals, with the exception of the communication terminal D1 that needs to be removed from the network, of the new network common key K0'.

However, the above-described LKH key distribution protocol was not devised with a multihop network system in mind. Since a multihop network system uses a communication system in which one or more terminals act as relays, the communication load related to delivering the key update message will be different for each communication terminal. Up to now, no efficient method has been developed for performing key update as described above using the unique characteristics of a multihop network.

SUMMARY OF THE INVENTION

The present invention has been devised in light of the above-described problems, and it is an object thereof to provide a new and innovative key update system, key management device, communication terminal, and key information construction method for a multihop network.

A first aspect of the invention provides a key update system for a multihop network system including a key management device that manages keys using a hierarchical structure, and a plurality of communication terminals that obtain the keys. The key management device constructs key information having a hierarchical structure that accords with the structure of the multihop network, and manages the key information. The key management device determines respective encryption keys for encrypting the keys based on the key information, and the communication terminals obtain the respective keys. The key management device includes: a key information management portion that constructs and manages the key information; an encryption portion that encrypts the keys using the keys included in the key information; and a transmission portion that transmits the encrypted keys encrypted by the encryption portion. Further, the communication terminals respectively include: a receiving portion that receives the encrypted keys; a key management portion that manages, among the keys included in the key information, the keys that need to be held and stored by any given one of the communication terminals; and a decryption portion that decrypts the encrypted keys.

According to the above structure, the key management device constructs the key information having the hierarchical structure that accords with the structure of the multihop network, and sends the encrypted keys to the communication terminals. Each communication terminal receives the encrypted keys and decrypts the encrypted keys that it needs to hold and store from among key information, thereby obtaining the keys. Thus, according to the key update system according to the present aspect of the present invention, construction of the key information having the hierarchical structure that accords with the structure of the multihop network allows key update to be performed efficiently.

The key management device may further include a key generation portion that generates keys. According to this structure, the key generation portion generates keys, and the generated keys are sent to the key information management portion. Thus, every time it is necessary to update the keys in the key information having the hierarchical structure, new keys can be generated.

The key management device may further include a one way value generation portion that has a one-way function. According to this structure, the one way value generation portion takes the generated key from the key generation portion as an initial input value for the one-way function, and generates one or more new keys. Thus, every time it is necessary to update the keys in the key information having the hierarchical structure, a new key can be generated that is used as a basis for deriving one or more new keys, while maintaining the characteristic that it is difficult to predict the keys of other groups included in the key information having the hierarchical structure.

Each communication terminal may further include a transmission portion that transmits the encrypted key. According to this structure, the transmission portion sends the encrypted key to the communication terminals located in the next hop of the multihop network. Thus, it is possible to send the keys within the multihop network.

Each communication terminal may further include a key update message analysis portion that analyses a destination of each encrypted key. According to this structure, the key update message analysis portion determines and identifies information related to key update of its own communication terminal, information that needs to be relayed to the communication terminals located in the next hop of the multihop network, and all other information. Thus, the destination of the encrypted keys can be analyzed, thereby allowing only the keys needed by communication terminals that require them to be sent.

Each communication terminal may further include a key update message generation portion that generates a message for sending just the encrypted keys that have destinations among the communication terminals in the next hop or after of the multihop network. According to this structure, the respective encrypted key and respective index values for the keys used in encryption are linked to generate the key update message. Thus, the communication terminals in the next hop or after that receive the key update message can decrypt the encrypted keys to update to the new keys.

Each communication terminal may further include a one way value generation portion that has a one-way function. According to this structure, the one way value generation portion applies the one-way function to the key received from the key management portion, and converts it to a new key. Thus, the received key update message can be used as a basis for decrypting the encrypted key, and once update to the new key is completed, the new key can be taken as the initial input value for the one-way function. Accordingly, one or more new keys can be derived.

In order to solve the above problems, another aspect of the present invention provides a key management device that manages key information that has a hierarchical structure that accords with the structure of a multihop network. The key management device includes: a key information management portion that constructs and manages the key information; an encryption portion that encrypts the keys using the keys included in the key information; and a transmission portion that transmits the encrypted keys encrypted by the encryption portion.

According to this structure, the key information management portion constructs the key information having the hierarchical structure that accords with the structure of the multihop network, and the encryption portion encrypts the keys using the keys included in the key information having the hierarchical structure constructed by the key information management portion. The transmission portion sends the encrypted keys to the multihop network. Thus, as a result of using the keys included in the key information having the hierarchical structure constructed in accordance with the structure of the multihop network, the key management device according to this aspect of the present invention is able to efficiently perform key update for the communication terminals included in the multihop network.

The key management device may further include a key generation portion that generates keys. According to this structure, the key generation portion generates keys, and the generated keys are sent to the key information management portion. Thus, every time it is necessary to update the keys in the multihop network, new keys can be generated.

The key management device may further include a one way value generation portion that has a one-way function. According to this structure, the one way value generation portion takes the generated key from the key generation portion as an initial input value for the one-way function, and generates one or more new keys. Thus, every time it is necessary to update the keys in the key information having the hierarchical structure, a new key can be generated that is used as a basis for deriving one or more new keys, while maintaining the characteristic that it is difficult to predict the keys of other groups included in the key information having the hierarchical structure.

In order to solve the above problems, yet another aspect of the present invention provides a communication terminal that obtains encrypted keys that are encrypted using keys included in key information that has a hierarchical structure that accords with the structure of a multihop network. The communication terminal includes: a receiving portion that receives the encrypted keys; a key management portion that manages, among the keys included in the key information, the keys that need to be held and stored by the communication terminal; and a decryption portion that decrypts the encrypted keys.

According to this structure, the receiving portion receives the encrypted key, and the decryption portion decrypts the encrypted key. The key management portion manages all of the keys in the tree structure along the route from the leaf that corresponds to its own communication terminal in the multihop network to the root of the tree. The key management portion also manages an index that indicates respective locations in a key tree of the keys included in the key information. Thus, as a result of using the keys included in the key information having the hierarchical structure constructed in accordance with the structure of the multihop network, the communication terminal according to this aspect of the present invention is able to efficiently perform key update in the multihop network.

The communication terminal may further include a transmission portion that transmits the encrypted key. According to this structure, the transmission portion sends the encrypted key to the communication terminals located in the next hop of the multihop network. Thus, it is possible to send the keys within the multihop network.

The communication terminal may further include a key update message analysis portion that analyzes a destination of each encrypted key. According to this structure, the key update message analysis portion determines and identifies information related to key update of its own communication terminal, information that needs to be relayed to the communication terminals located in the next hop of the multihop network, and all other information. Thus, the destination of the encrypted keys can be analyzed, thereby allowing only the keys needed by communication terminals that require them to be sent.

The communication terminal may further include a key update message generation portion that generates a message for sending just the encrypted keys that have destinations among the communication terminals in the next hop or after of the multihop network. According to this structure, the respective encrypted keys and respective index values for the keys used in encryption are linked to generate the key update message. Thus, the communication terminals in the next hop or after that receive the key update message can decrypt the encrypted keys to update to the new keys.

The communication terminal may further include a one way value generation portion that has a one-way function. According to this structure, the one way value generation portion applies the one-way function to the key received from the key management portion, and converts it to a new key. Thus, the received key update message can be used as a basis for decrypting the encrypted key, and once update to the new key is completed, the new key can be taken as the initial input value for the one-way function. Accordingly, one or more new keys can be derived.

In order to solve the above-described problems, yet another aspect of the invention provides a key information construction method including: grouping, from among communication terminals in a multihop network that have terminal devices functioning as parents, those communication terminals that have the same terminal device functioning as a parent; and constructing key information having a hierarchical structure.

According to the above method, any given one of the communication terminals determines whether any other terminals exist in a key tree that share a parent terminal with it. If such a terminal exists, the terminal is added to the subtree formed by the terminal that has the shared parent terminal. If no such terminal exists, the terminal is added to a new subtree. This processing is performed until all of the communication terminals are assigned as leaves of the key tree. Thus, the key tree construction method according to the present aspect of the present invention allows key update to be performed efficiently in the multihop network.

In the case that any given one of the communication terminals does not share a parent terminal with any other one of the communication terminals, the key information construction method may further include: establishing a new group that has the given communication terminal as an initial member; and constructing new key information that has a hierarchical structure. According to this method, key update can be performed efficiently in the multihop network.

The present invention provides a key update system, a key management device, a communication terminal, and a key information construction method for a multihop network.

DETAILED DESCRIPTION OF THE PREFERRED EMBODIMENTS

Figure 1:
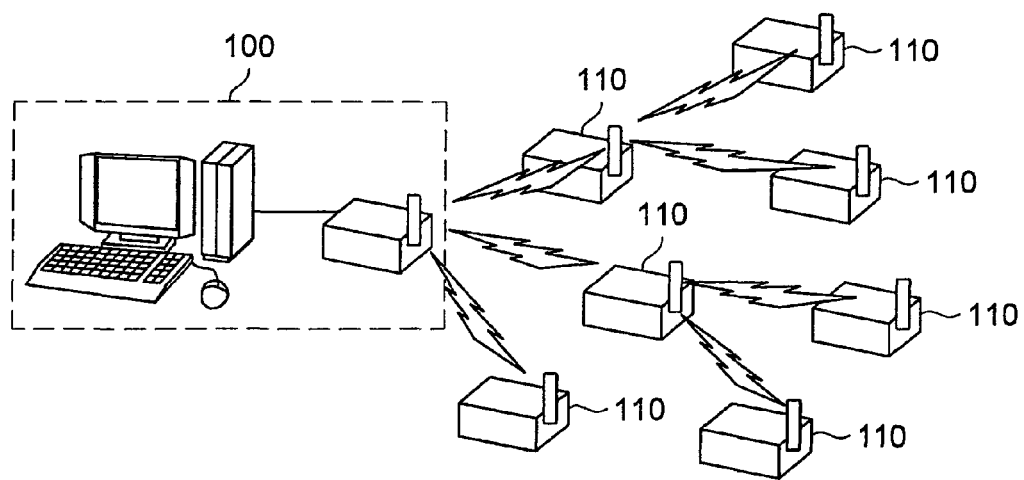
FIG. 1 is an explanatory diagram showing the normal structure of a multihop network system.

Hereinafter, preferred embodiments of the present invention will be described in detail with reference to the drawings. Note that, in this specification and the appended drawings, structural elements that have substantially the same function and structure are denoted with the same reference numerals, and repeated explanation of these structural elements is omitted.

First Embodiment

Figure 2:
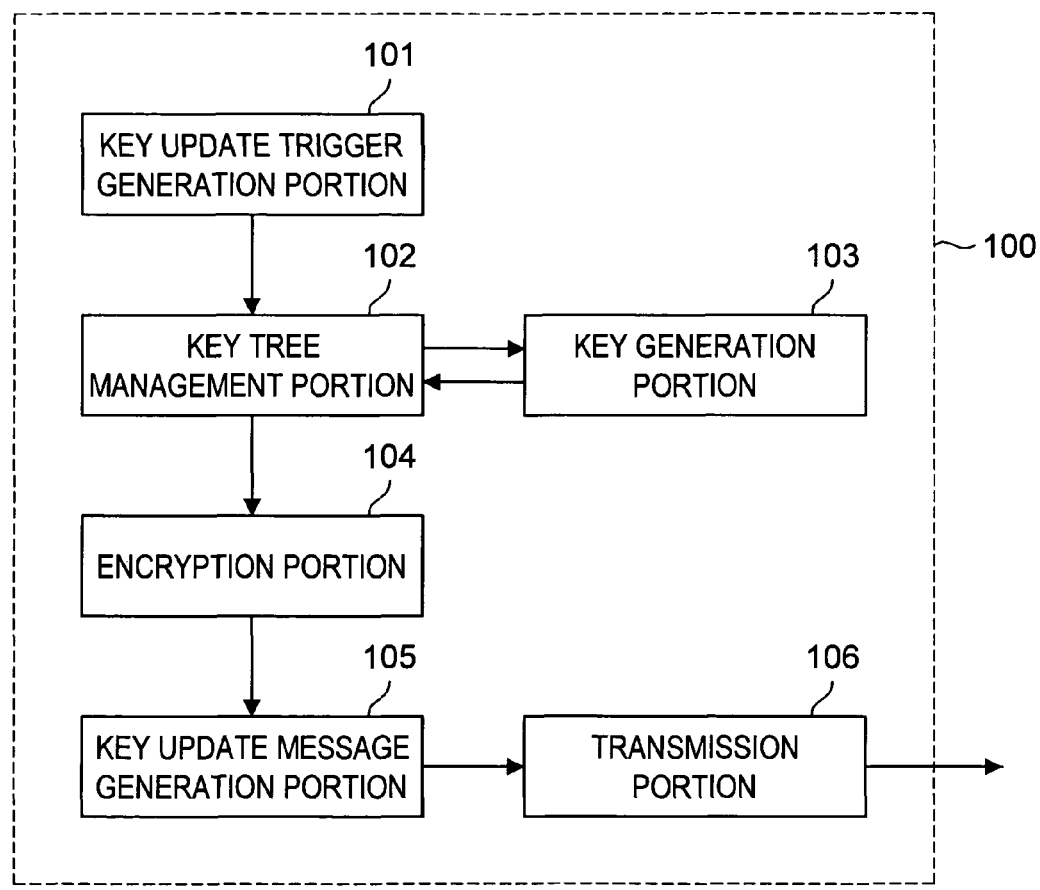
FIG. 2 is an explanatory diagram showing the internal structure of an authentication management device according to a first embodiment of the present invention.

FIG. 2 is an explanatory diagram showing the internal structure of an authentication management device according to a first embodiment of the present invention. As can be seen from FIG. 2, an authentication management device 100 according to the first embodiment of the present invention is an example of a key management device that hierarchically manages keys. The authentication management device 100 includes a key update trigger generation portion 101, a key tree management portion 102, a key generation portion 103, an encryption portion 104, a key update message generation portion 105, and a transmission portion 106. In the present embodiment, the key hierarchy is represented by a tree structure.

The key update trigger generation portion 101 generates a key update start message, and sends the key update start message to the key tree management portion 102. The key update start message is generated when a new communication terminal joins the network or when a communication terminal that is presently a member of the network is removed from the network. In addition to these occasions, the key update start message may also be generated at various other timings, such as when a determined time interval has elapsed. For example, when a new communication terminal joins the network, ID information for the new communication terminal, an authentication key for the new communication terminal, and route information indicating which communication terminals in the network are connected to the new communication terminal may be sent to the key tree management portion 102 as the key update start message. The authentication key of the communication terminal is a key that is shared one-to-one by the communication terminal and the authentication management device 100. In addition, for example, when a communication terminal that is presently a member of the network is removed from the network, ID information for the communication terminal may be taken as ID information for the terminal that needs to be removed and sent to the key tree management portion 102 as the key update message.

Figure 4:
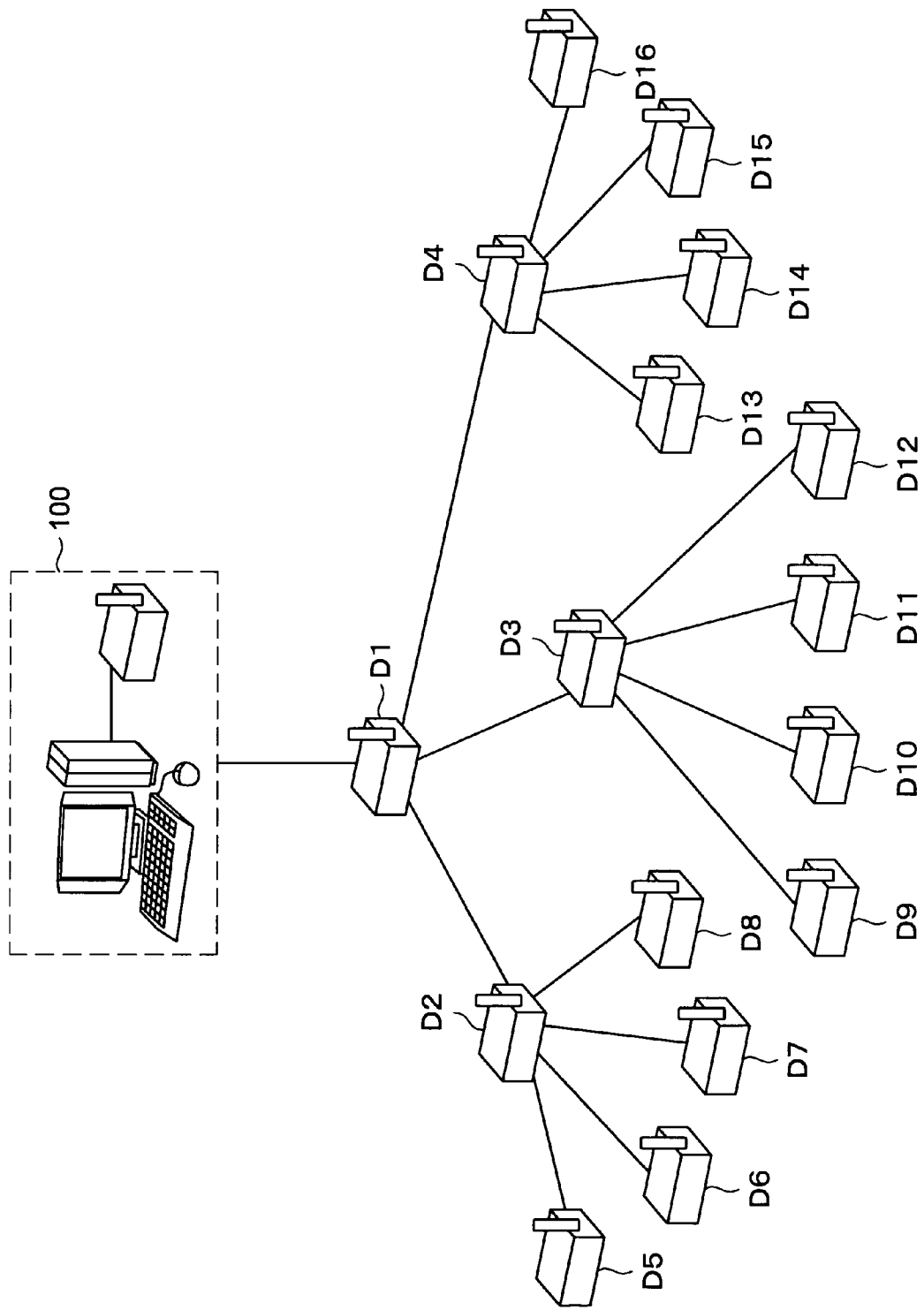
FIG. 4 is an explanatory diagram showing a multihop network model according to the first embodiment of the present invention.
Figure 5:
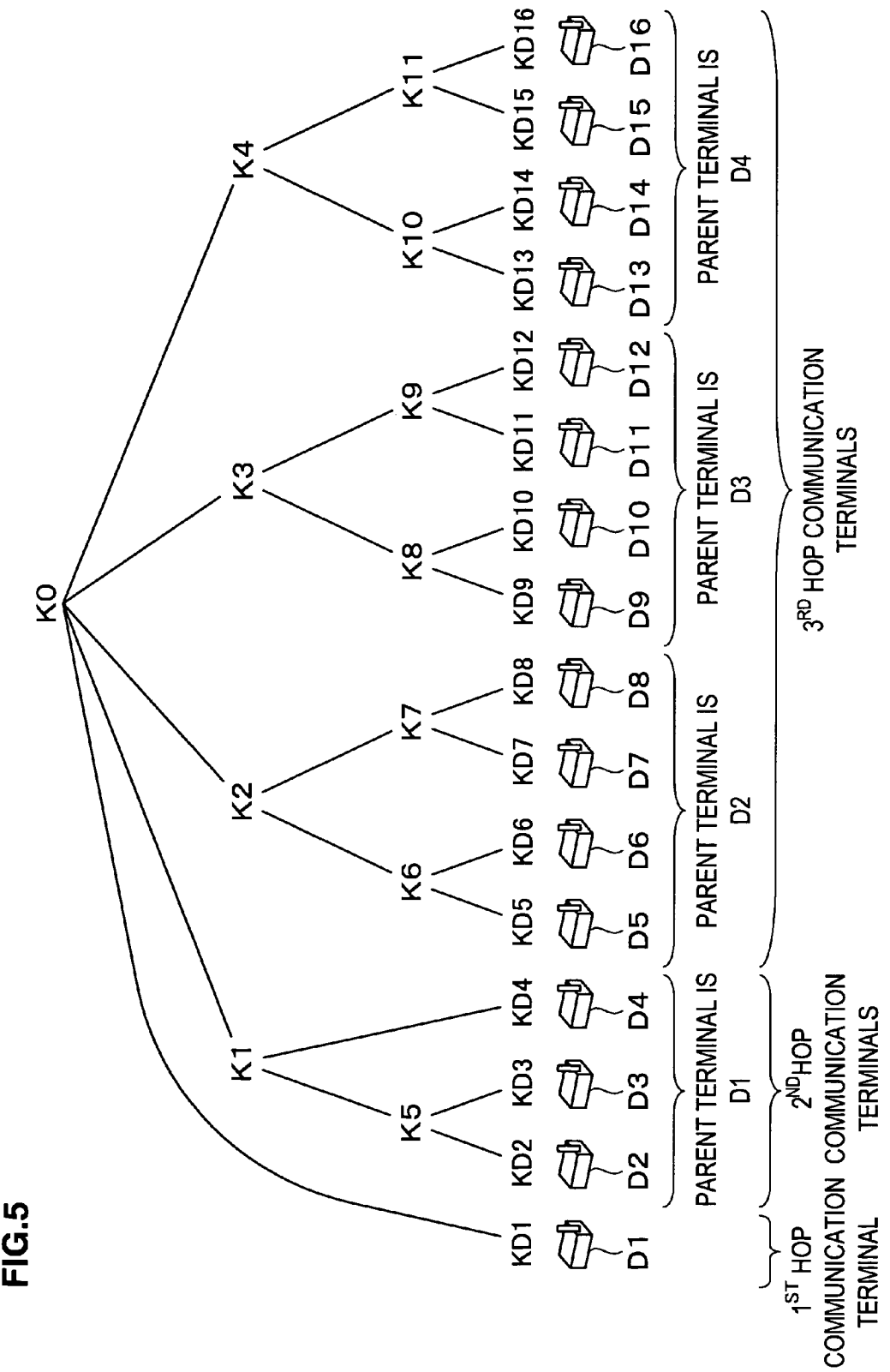
FIG. 5 is an explanatory diagram showing the structure of key information that has a hierarchical structure associated with a tree structure according to the first embodiment of the present invention.

The key tree management portion 102 is one example of a key information management portion, and manages a key tree in which each communication terminal that is a member of the network forms a leaf of a tree structure. The key tree management portion 102 manages all of the keys that exist in the managed tree structure, from the root to each and every leaf, and manages the location of the keys within the key tree. FIG. 4 is an explanatory diagram showing an example of a multihop network system. FIG. 5 is an explanatory diagram showing an example of a key tree structure that is constructed using a multihop network model shown in FIG. 4. The main feature of a key tree construction method of the present embodiment is that subtrees are formed in the key tree in which all the communication terminals that share parent terminals one hop before in the route from the authentication management device 100 to each communication terminal are leaves.

In FIG. 4, the communication terminals D2, D3, D4 have the communication terminal D1 as a shared parent terminal. In this case, the key tree is configured with a subtree in which the communication terminals D2, D3, D4 are a group, namely, a group having a key K1. Further, in FIG. 4, the communication terminals D5, D6, D7, D8 have communication terminal D2 as a shared parent terminal. In this case, the key tree is configured with a subtree in which the communication terminals D5, D6, D7, D8 are a group, namely, a group having a key K2. In the present embodiment, when there are three or more communication terminals forming a group, a binary tree like that of LKH explained in the known art is formed, and then a subtree is formed within the group and keys are assigned. However, the present invention is not limited to this structure. The main feature of the key tree construction method according to the present invention is the formation of subtrees in which parent terminals have identical communication terminals as leaves.

The key tree management portion 102 receives the key update start message from the key update trigger generation portion 101 and uses it as a basis for determining the location of the keys within the managed key tree that need to be updated. For example, if the key tree management portion 102 recognizes based on the key update start message that the communication terminal D5 is to be removed from the network, the key tree management portion 102 determines that the keys that need to be updated are the keys within the key tree from the root to the leaf that corresponds to the communication terminal D5, namely, K6, K2 and K0. Based on this determination of the keys that need to be updated, the key tree management portion 102 sends a key request message to the key generation portion 103, and then receives new key information from the key generation portion 103. The keys that need to be updated within the key tree are then replaced with the new keys assigned by the key generation portion 103. Next, the key tree management portion 102 determines which communication terminals need to be notified of the new keys etc., and which group keys within the key tree can be efficiently used for encryption.

For example, in FIG. 5, if the communication terminal D5 is to be removed from the network, the keys K6, K2 and K0 need to be respectively updated to new keys K6', K2', and K0'. First, it is necessary to notify just the communication terminal D6 that holds and stores the key K6 that the key K6 is being updated to the key K6'. In order to perform this, it is necessary to prepare a message that encrypts the key K6' using key KD6. Next, in order to efficiently notify the communication terminals D6, D7, D8 that hold and store the key K2 that the key K2 is being updated to the key K2', messages that respectively encrypt the key K2' using keys KD6', K7 are prepared. Finally, in order to efficiently notify all of the communication terminals that hold and store the key K0 that the key K0 is being updated to the key K0', messages that respectively encrypt the key K0' using the keys KD1, K1, K2', K3, K4 are prepared.

The key tree management portion 102 selects in order, from the key that exists at the deepest location in the key tree amongst the updated keys, the respective keys that are at locations one deeper than the updated keys as the encryption key, as described above. Then, the newly updated key, the encryption key that is used to encrypt the key, the location within the key tree of the encryption key, and an index value that indicates the number of hops of the group including the encryption key from the authentication management device 100, are sent as a set to the encryption portion 104. Note that, the present invention is not limited in any particular way with respect to the storage method used for the location of each encryption key in the key tree, and the index value that indicates the group including the encryption key and the number of hops of the communication terminals that form the group from the authentication management device 100. However, the main feature of a key update system using the key tree constructed according to the present invention is that the structure allows each communication terminal to determine which group is the destination for the respective generated encrypted updated keys.

For example, in the key tree in FIG. 5, use of following index values, or the like, is possible. More specifically, in the case of indicating the group holding the key K0, an index value "0 (no hops<Network common key>)", could be used; in the case of indicating the group holding the key KD1 at the location of the communication terminal D1, the index value "1-0 (the $0^{th}$ group located in the $1^{st}$ hop)"; in the case of indicating the group holding the key K1, the index value "2-0 (the $0^{th}$ group located in the $2^{nd}$ hop)", in the case of indicating the group holding the key K5, "2-0-0 (the $0^{th}$ group in the $0^{th}$ group located in the $2^{nd}$ hop)"; and in the case of indicating the group holding the key KD6 located in the communication terminal D6, "3-0-0-1 (the $1^{st}$ group in the $0^{th}$ group in the $0^{th}$ group located in the $3^{rd}$ hop)".

When the key generation portion 103 receives the key request message from the key tree management portion 102, the key generation portion 103 generates a random bit string with a predetermined length, and sends the generated bit string to the key tree management portion 102. The key generation portion 103 may include a random number generator.

The encryption portion 104 receives the set of information, namely, the newly updated key, the encryption key used for encrypting the updated key, and the index value of the encryption key from the key tree management portion 102. Then, the encryption portion 104 uses the received encryption key to encrypt the newly updated key, and sends the index value of the encryption key and the generated encrypted updated key as a set to the key update message generation portion 105. In the present embodiment, the encryption method used by the encryption portion 104 is not particularly limited. However, it is necessary to use an encryption system that is safe when the system is being used. Examples of safe encryption systems include AES cipher, 3-DES cipher or the like.

When the key update message generation portion 105 receives one or more sets of the encrypted updated keys and the index values of the key used for encryption from the encryption portion 104, the key update message generation portion 105 links the plurality of sets, and generates a key update message. The key update message generation portion 105 then sends the generated key update message to the transmission portion 106.

The transmission portion 106 broadcasts the key update message received from the key update message generation portion 105 to the communication terminals in the network. Various transmission methods can be suggested such as broadcast, multicast, unicast, a broadcast request from a parent terminal to a child terminal, a multicast request from a parent terminal to a child terminal, a unicast request from a parent terminal to a child terminal, or the like. The present invention is not particularly limited with regard to the transmission method used, and thus the present invention may be carried out using any one of the above methods. In order to minimize the traffic volume related to the updating of keys, the present invention may be carried out using a combination of a plurality of the above methods in accordance with the construction of the network.

Hereinabove, the internal structure of the authentication management device according to the present embodiment has been explained using FIG. 2. Next, the internal structure of a communication terminal according to the present embodiment will be described with reference to FIG. 3.

Figure 3:
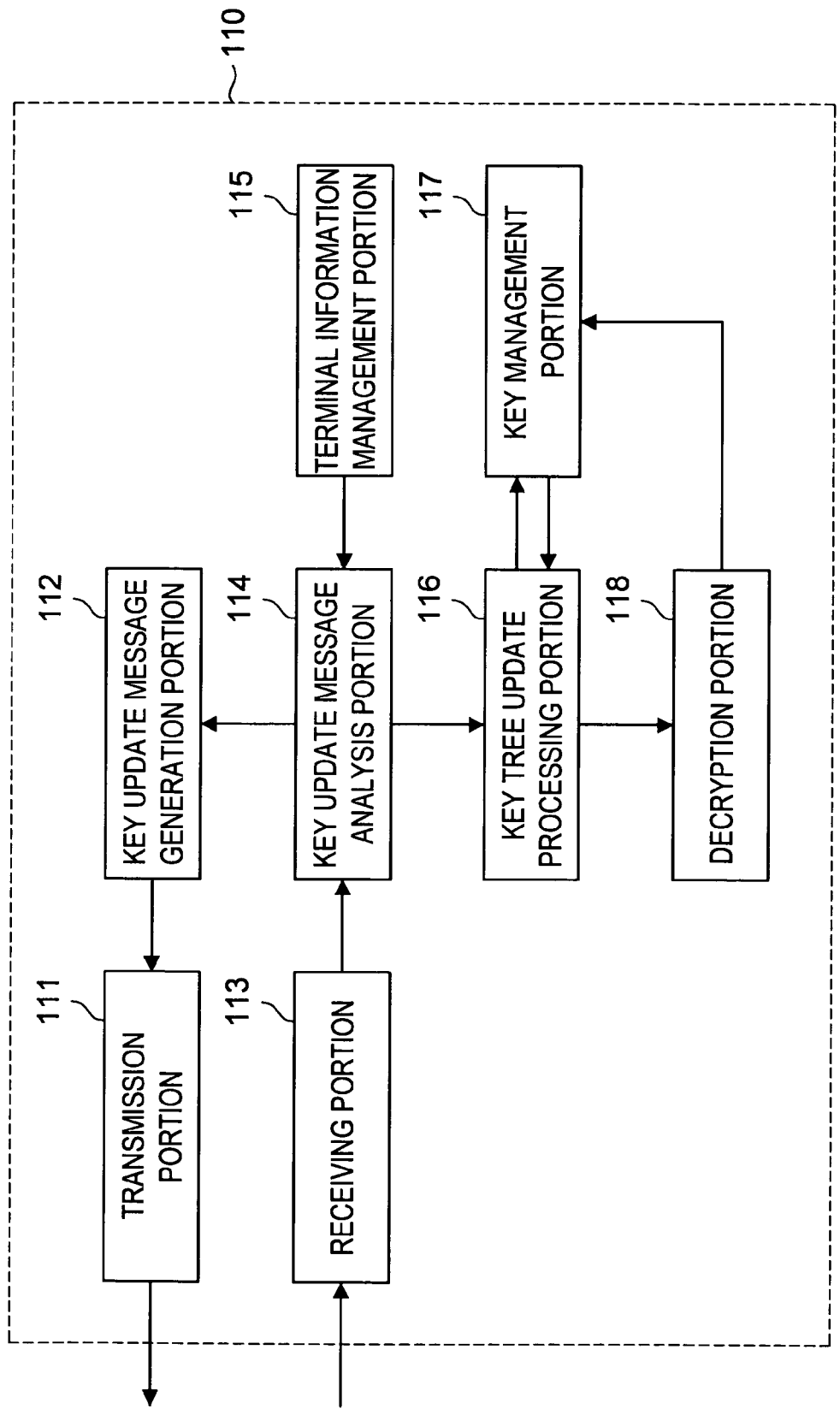
FIG. 3 is an explanatory diagram showing the internal structure of a communication terminal according to the first embodiment of the present invention.

FIG. 3 is an explanatory diagram showing the internal structure of a communication terminal 110 according to the first embodiment of the present invention. The communication terminal 110 according to the first embodiment of the present embodiment includes a transmission portion 111, a key update message generation portion 112, a receiving portion 113, a key update message analysis portion 114, a terminal information management portion 115, a key tree update processing portion 116, a key management portion 117, and a decryption portion 118.

The receiving portion 113 receives the key update message sent by the authentication management device 100, or receives the key update message via another communication terminal 110. The receiving portion 113 sends the received key update message to the key update message analysis portion 114.

The terminal information management portion 115 shares information with the authentication management device 100 indicating which group in the key tree the communication terminal 110 belongs to. For example, the information shared with the authentication management device 100 may include: information regarding the location of the communication terminal 110, namely, the number of hops of its location from the authentication management device 100; and information indicating which leaf the communication terminal 110 is located at in the key tree managed by the authentication management device 100, namely, the location of the communication terminal 110 within the key tree. With regard to the method of representing this information, a method that is pre-specified with the authentication management device 100 is used. In order to represent this information, an index value like that described with reference to the key tree management portion 102 of FIG. 2 may be used. For example, in the case of the communication terminal D6 of FIG. 5, the index value "3-0-0-1 (the $1^{st}$ communication terminal in the $0^{th}$ group in the $0^{th}$ group located in the $3^{rd}$ hop)" may be used. The terminal information management portion 115 sends this information to the key update message analysis portion 114. The information managed by the terminal information management portion 115 and the key tree information managed by the authentication management device 100 is synchronized.

The key update message analysis portion 114 determines information related to key update of the communication terminal 110, information that needs to be relayed to the communication terminals in the next hop, and other information from the received key update message, based on the key update message received from the receiving portion 113, and the number of hops of the communication terminal 110 from the authentication management device 100 and the position within the key tree of the communication terminal 110 received from the terminal information management portion 115. The key update message analysis portion 114 checks in order the index values of the encryption keys that form sets with the encrypted update keys and that are included in the received key update message. Then, the key update message analysis portion 114 supplies from amongst these index values the information that is related to update of the key of the communication terminal 110 to the key tree update processing portion 116, and supplies the information that needs to be relayed to the communication terminals in the next hop to the key update message generation portion 112.

For example, let us consider a case in which the communication terminal D1 in FIG. 5 receives the following message as the key update message: ""1-0" E (KD1, K0') | | "2-0" E (K1, K0') | | "3-0-0-1" E (KD6, K6') | | "3-0-0" E (K6', K2') | | "3-0-1" E (K7, K2') | | "3-0" E (K2', K0') | | "3-1" E (K3, K0') | | "3-2" E (K4, K0')". The information received from the terminal information management portion 115, namely, the index value "1-0 (the $0^{th}$ terminal of the $1^{st}$ hop)" and the index value included in the key update message are compared, thereby allowing determination that the only information relevant to the key held and stored by the communication terminal D1 is ""1-0" E (KD1, K0')". Accordingly, the information ""1-0" E (KD1, K0')" is extracted from the key update message and sent to the key tree update processing portion 116. Next, the message generated for the $1^{st}$ hop communication terminal addresses, which is the number of hops of the communication terminal D1 from the authentication management device 100, is identified from the key update message, and the remainder of the message is sent to the key update message generation portion 112. In this case, since all of the message apart from the message ""1-0" (KD1, K0')" is for communication terminal addresses in the $2^{nd}$ hop or after, all of the information with the exception of the message ""1-0" (KD1, K0')" is sent to the key update message generation portion 112.

The key tree update processing portion 116 identifies, from the one or more sets of encrypted update keys and the index values for those encryption key received from the key update message analysis portion 114, the sets that are at a deeper location in the key tree while referring to the index values. Then, the key tree update processing portion 116 directs the decryption operation of the encrypted update keys in order from the key that is located at the deepest position. The key tree update processing portion 116 sends the index value for each set in order from the selected set to the key management portion 117. The key tree update processing portion 116 then obtains the respective decryption keys that correspond to the respective index values from the key management portion 117. In addition, a set of information, namely, the encrypted update key, the decryption key obtained from the key management portion 117, and an index value indicating the node whose depth is one hierarchical level higher than the location in the key tree indicated by the index value, is sent to the decryption portion 118. For example, in the case that the index value of the encryption key is "3-0-0-1", the index value indicating the node whose depth is one hierarchical level higher than the location in the key tree indicated by the index value would correspond to "3-0-0". The index value sent to the decryption portion 118 represents the location of the decrypted key in the key tree managed by the authentication management device 100

The decryption portion 118 receives the set of the encrypted update key, the decryption key for decrypting the encrypted update key, and the index value from the key tree update processing portion 116, and uses the received decryption key to decrypt the encrypted update key to obtain the newly updated key. Then the decryption portion 118 sends the obtained key and the index value as a set to the key management portion 117. Note that, the decryption method used by the decryption portion 118 must correspond with the encryption method used by the encryption portion 104 of the authentication management device 100 explained using FIG. 2. For example, in the case that the encryption portion 104 of the authentication management device 100 explained using FIG. 2 employs an encryption method that uses AES cipher, the decryption portion 118 employs a decryption method that uses AES cipher.

The key management portion 117 manages all of the keys in the key tree managed by the authentication management device 100 from the leaf that corresponds to the key management portion 117 itself to the root of the tree, including all the keys along the route thereto, and also manages the index values that indicate the locations in the key tree of the keys. In the key tree, the key that is at the leaf corresponding to the communication terminal 110 represents an authentication key that is shared one-to-one by the communication terminal 110 and the authentication management device 100. Further, the key at the root of the tree represents a network common key that is held by all of the communication terminals in the network. When the key management portion 117 receives the index value indicating the location in the key tree from the key update message analysis portion 114, the key management portion 117 responds by sending, from among the keys it is managing, the key of the key tree that corresponds to the index value to the key tree update processing portion 116. In addition, the key management portion 117, which receives the set of the index value indicating the location in the key tree and the new key received from the decryption portion 118, manages the received key as the new key that is at the location in the key tree indicated by the index value. The information managed by the key management portion 117 is synchronized with the key tree information managed by the authentication management device 100.

The key update message generation portion 112 receives one or more sets of the encrypted update keys and the index values used for encryption, and links this plurality of sets to generate a key update message. The key update message generation portion 112 then sends the generated key update message to the transmission portion 111.

The transmission portion 111 broadcasts the key update message received from the key update message generation portion 112 to the communication terminals (nodes) in the next hop. Various types of transmission method can be suggested such as broadcast, multicast, unicast, and the like. The present invention is not particularly limited with regard to the transmission method used, and thus may be carried out using any one of the above methods. Moreover, the present invention may be carried out using a combination of a plurality of the above methods in accordance with the construction of the network.

Hereinabove, the internal structure of the communication terminal according to the first embodiment of the present invention has been explained with reference to FIG. 3. Next, FIG. 6 will be used to describe the key tree construction method according to the first embodiment of the present invention.

Figure 6:
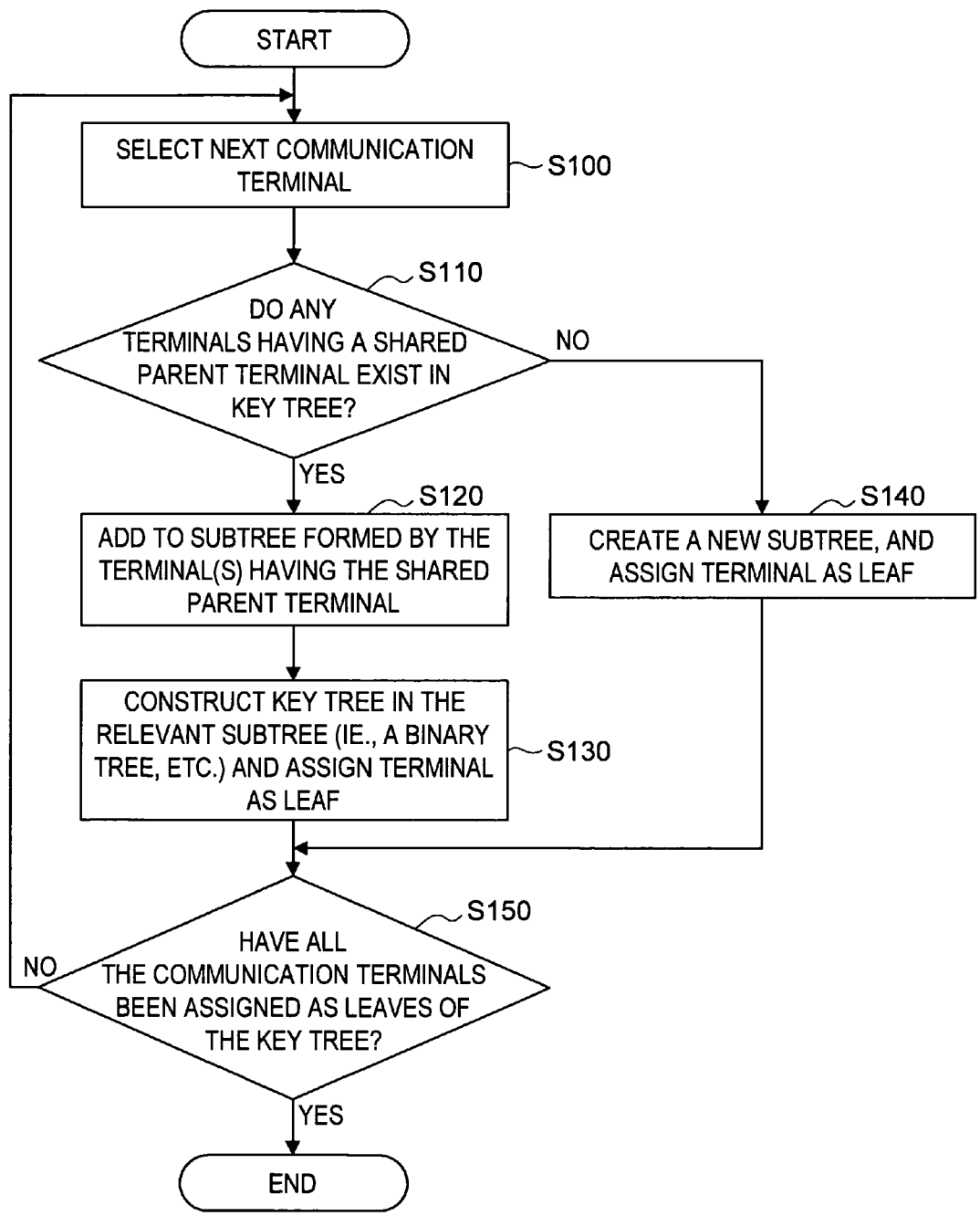
FIG. 6 is an explanatory diagram showing a construction method used for constructing the key information that has the hierarchical structure associated with the tree structure according to the first embodiment of the present invention.

FIG. 6 is a flow chart showing the key tree construction method according to the first embodiment of the present invention. When the key tree construction process starts, first, an initial communication terminal is selected (step S100). Then, it is determined whether there is already a terminal that shares a parent terminal with the selected communication terminal in the key tree (step S110). If there is already a terminal that has a shared parent terminal, then the selected terminal is added to the subtree formed by the terminal that has the shared parent terminal (step S120). When the terminal is added, a key tree is constructed in the subtree, and the terminal is assigned as a leaf (step S130). As the structure that configures the key tree, various structures such as a binary tree or an n-ary tree may be used. On the other hand, in the case that there is no existing terminal in the key tree that has a shared parent terminal in step S110, a new subtree is formed and the terminal assigned as a leaf (step S140).

Next, it is determined whether all of the communication terminals have been assigned as leaves of the key tree (step S150). In the case that all of the communication terminals have been assigned as leaves of the key tree, the process is ended. In the case that assignment of the communication terminals has not been completed, the process returns to step S110 and repeats until all of the communication terminals have been assigned as leaves of the key tree.

Hereinabove, the key tree construction method according to the first embodiment of the present invention has been explained with reference to FIG. 6. Next, FIGS. 7 to 12 will be used to explain the operation of the key update system according to the first embodiment of the present invention.

Figure 7:
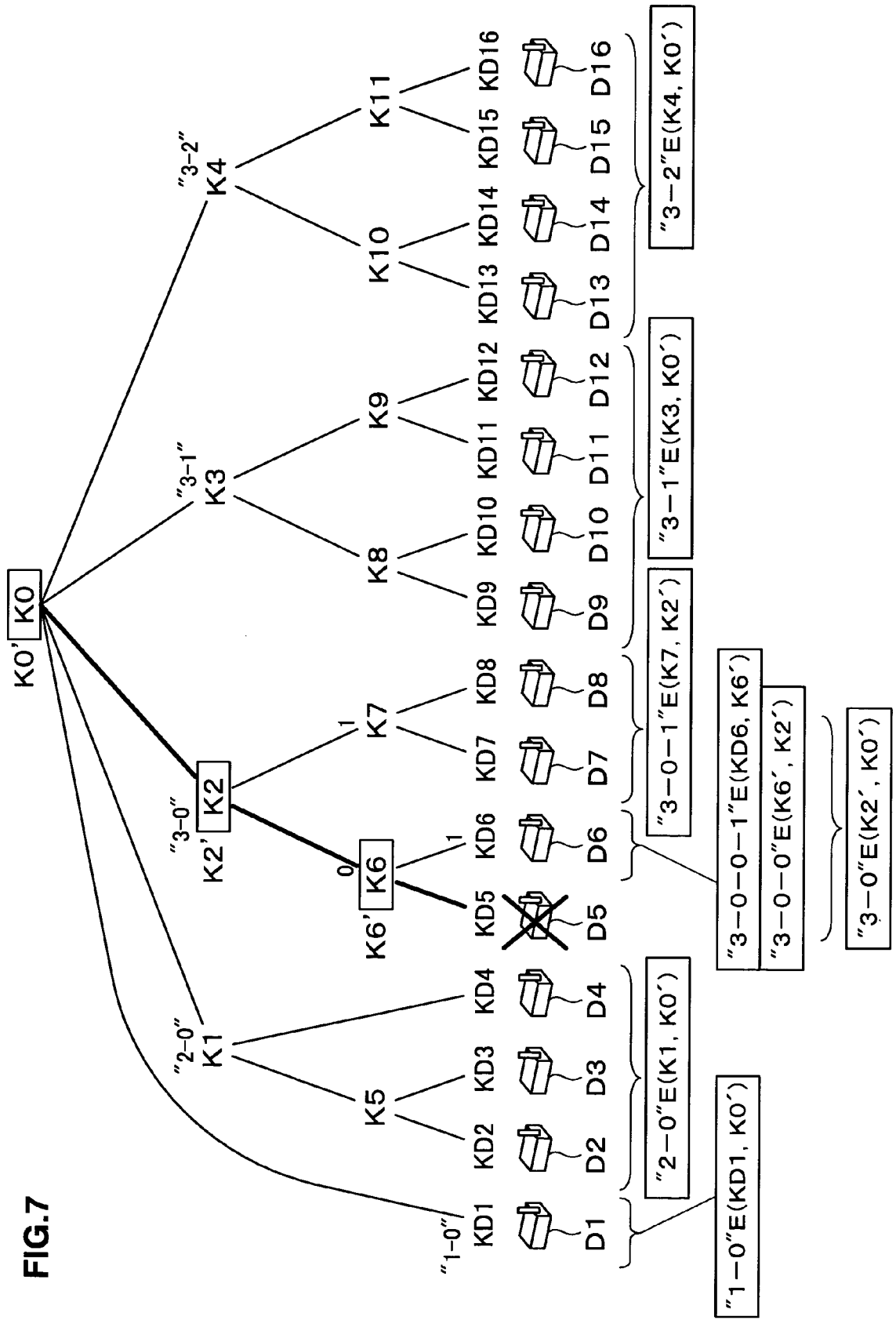
FIG. 7 is an explanatory diagram showing the operation of the authentication management device when a communication terminal is removed from a network according to the first embodiment of the present invention.

FIG. 7 is an explanatory diagram showing the operation performed by the authentication management device 100 when the communication terminal D5 is removed from the network in the multihop network model shown in FIG. 4. The communication terminals D1 to D16 have an internal structure that is the same as that of the communication terminal 110.

In order to remove the communication terminal D5, first, the key update trigger generation portion 101 sends a key update start message for removing the communication terminal D5 from the network to the key tree management portion 102.

The key tree management portion 102 updates the keys K6, K2, K0 that are in the route from the leaf that corresponds to the communication terminal D5 to the root of the key tree with random values K6', K2', K0', respectively, that are generated by the key generation portion 103. Next, it is determined which communication terminals need to be notified about the updated keys, and which keys within the key tree can be efficiently used for encryption based on the structure of the key tree. The updated keys, the encryption keys used for encrypting the keys, and the index values indicating the location of the encryption keys within the key tree and which subtree they belong to are then sent as a set to the encryption portion 104. The information about which subtree the encryption keys belongs to is information that specifies which subtree the key is in, and more specifically, which specifies which subtree the key is in by identifying the number of hops from the authentication management device 100 of the location of the communication terminals that form the subtree.

In the encryption portion 104, the update key received from the key tree management portion 102 is encrypted using the encryption key that is also received from the key tree management portion 102. The generated encryption update key is sent to the key update message generation portion 105 as a set with the index value received from the key tree management portion 102.

Figure 8:
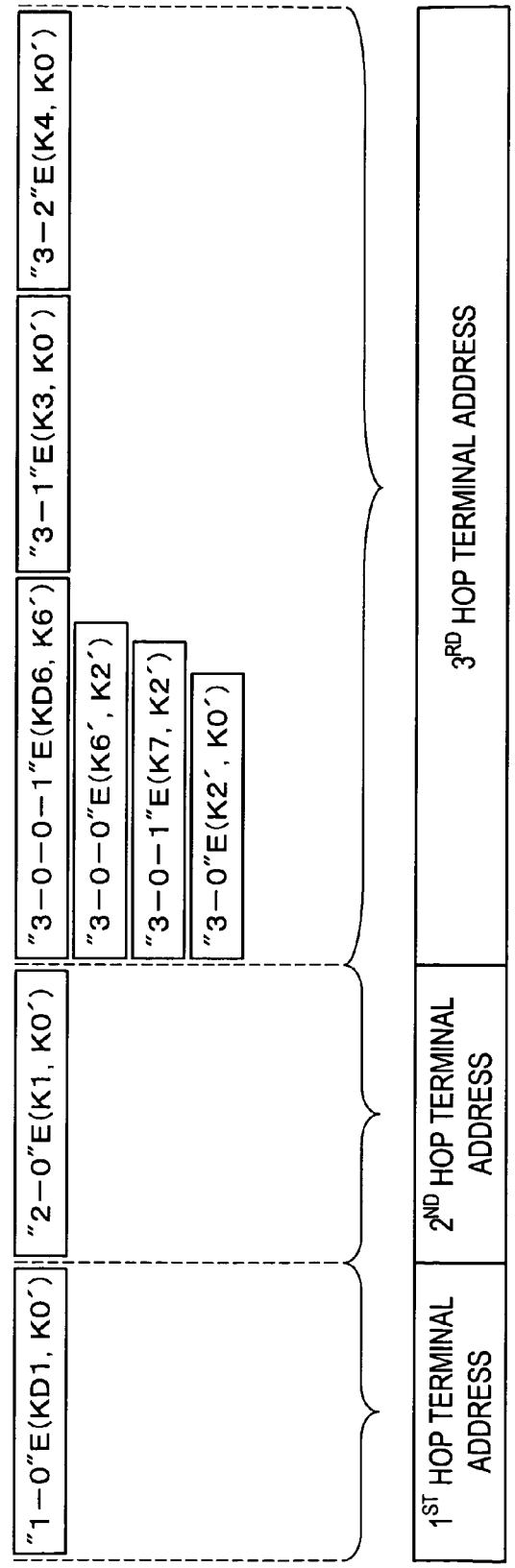
FIG. 8 is an explanatory diagram showing an example of a key update message according to the first embodiment of the present invention.

The key update message generation portion 105 links the one or more sets of encryption update keys and the index values received from the encryption portion 104 to generate the key update message. Then, the key update message generation portion 105 sends the key update message to the communication terminal via the transmission portion 106. FIG. 8 is an explanatory diagram showing an example of the generated key update message. FIG. 8 shows an example in which key update messages for a $1^{st}$ hop terminal address, a $2^{nd}$ hop terminal address, and a $3^{rd}$ hop terminal address form a single set. An index value is attached to each encryption update key included in the key update message. The structure of the key update message is such that the communication terminal that has received the key update message is able to identify the number of hops from the authentication management device 100 of the communication terminal address that the encryption update key is generated for, and in addition which key in the key tree is used for the encryption of the encryption update key.

Figure 9:
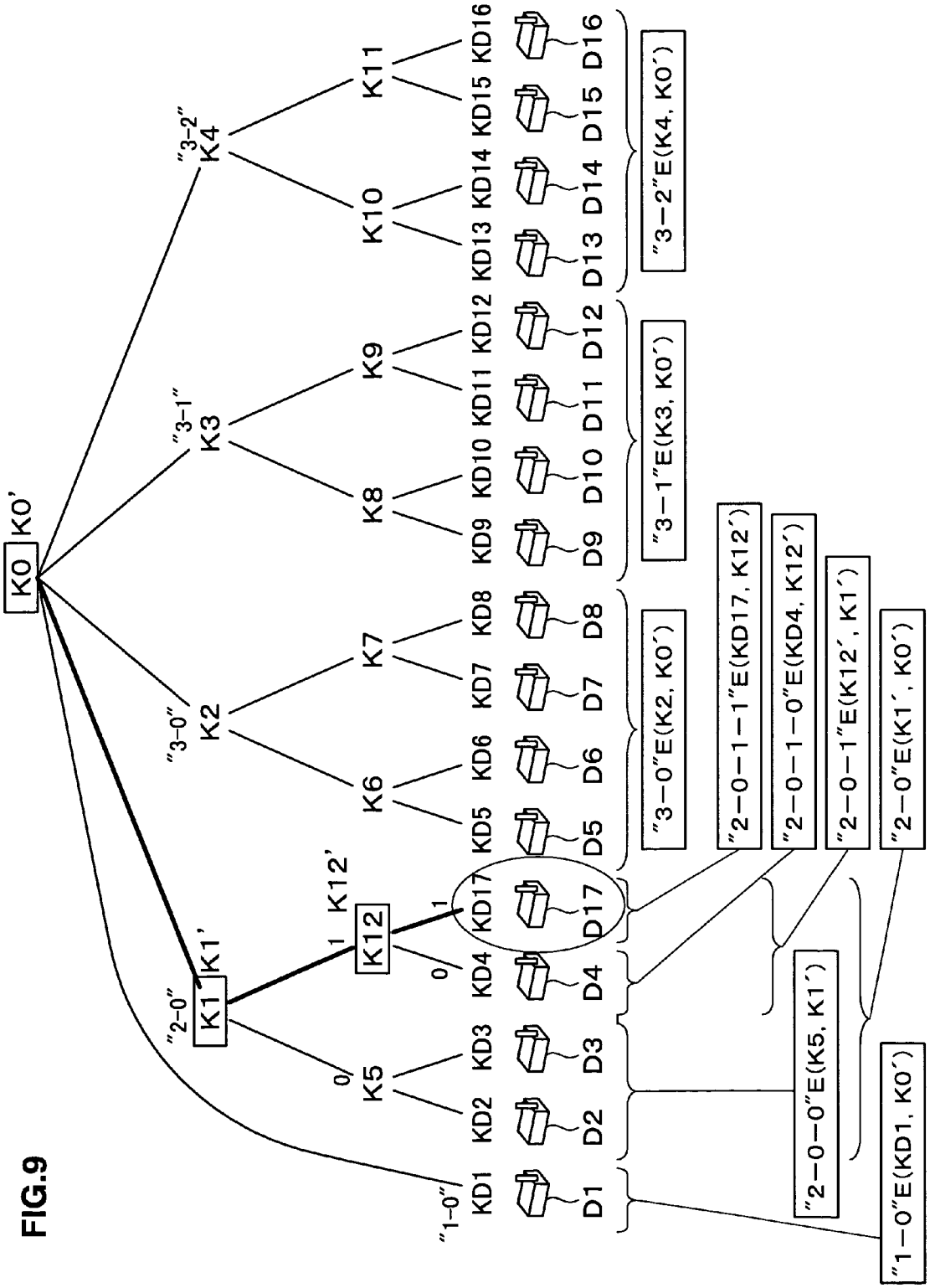
FIG. 9 is an explanatory diagram showing the operation of the authentication management device when a communication terminal joins the network according to the first embodiment of the present invention.

FIG. 9 is an explanatory diagram showing the operation performed by the authentication management device 100 when a communication terminal D17 is added to the network in the multihop network model shown in FIG. 4. The communication terminal D17 has the same structure as the communication terminal 110.

When the communication terminal D17 is added to the network, first, the key update trigger generation portion 101 sends a key update start message for adding the communication terminal D17 to the network to the key tree management portion 102.

The key tree management portion 102 updates the keys K12, K1, K0 that are in the route from the leaf that corresponds to the communication terminal D17 to the root of the key tree with random values K12', K1', K0', respectively, that are generated by the key generation portion 103. The flow of the processing performed next is the same as that performed when the communication terminal D5 of FIG. 7 was removed from the network, and thus a repeated explanation will be omitted here.

Figure 10:
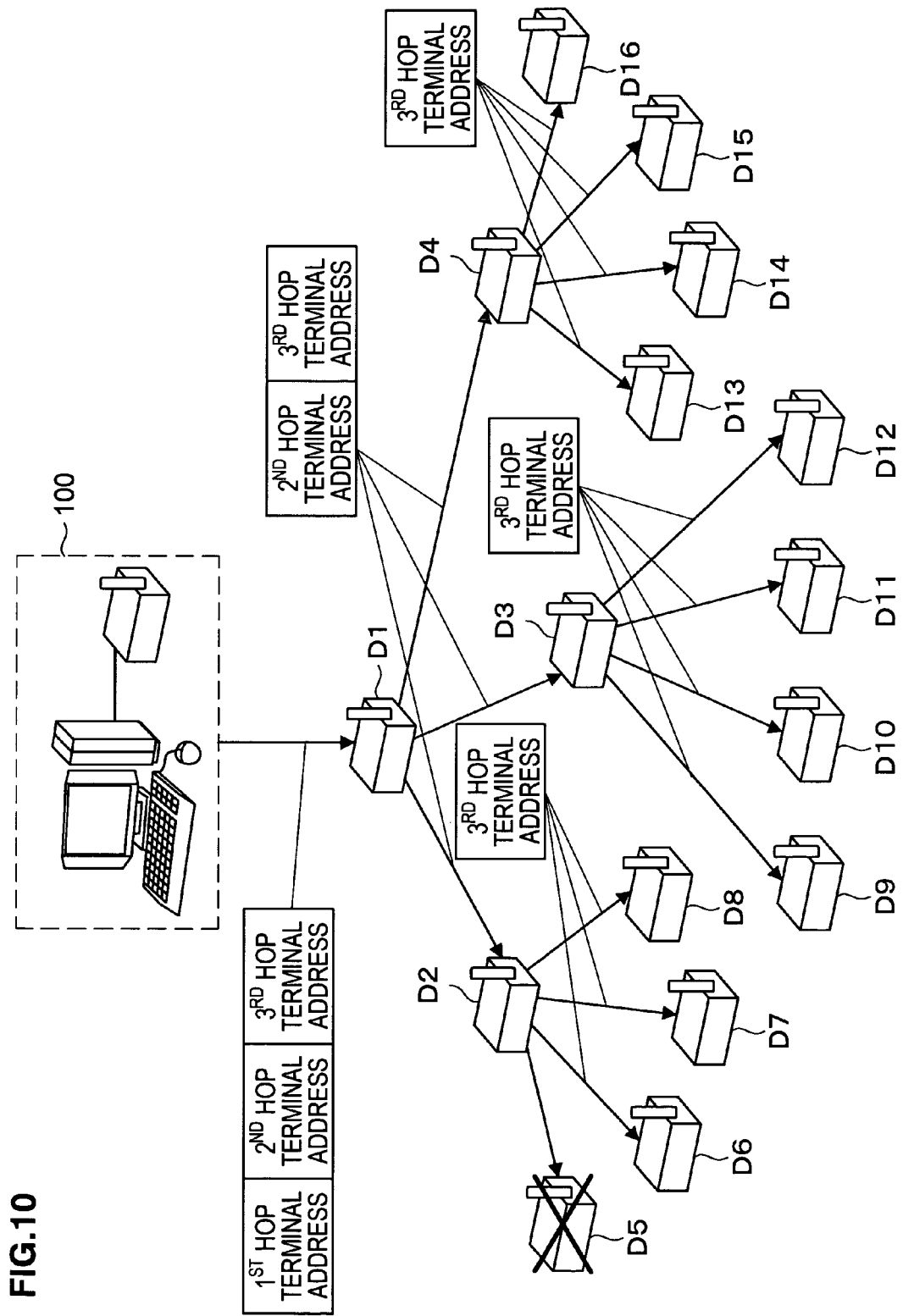
FIG. 10 is an explanatory diagram showing an outline of a relay method of a communication terminal that has received a key update message according to the first embodiment of the present invention.

FIG. 10 is an explanatory diagram showing an outline of how the communication terminal that receives the key update message relays the key update message to the next hop communication terminals. The communication terminal that has received the key update message is able to process the set of one or more encryption update keys and index values included in the key update message, and determine the number of hops from the authentication management device 100 of the communication terminal address that the set of the information was generated for. In the present embodiment, each communication terminal that has received the key update message references the information about the number of hops of its own location from the authentication management device 100, and the index values included in the key update message. Based on this, only information generated for communication terminal addresses in the next hop or after is transferred as the key update message.

For example, the communication terminal D1 that is located in the $1^{st}$ hop from the authentication management device 100 references the index value included in the $1^{st}$ hop terminal destination key update message within the key update message sent by the authentication management device 100, and transfers only the information generated for communication terminal addresses in the $2^{nd}$ hop or after to the communication terminals D2, D3, D4 in the $2^{nd}$ hop. The $2^{nd}$ hop communication terminals D2, D3, D4 refer to the index value included in the key update message for the $2^{nd}$ hop terminal address, and transfer only information generated for communication terminals in the $3^{rd}$ hop or after to the communication terminals in the $3^{rd}$ hop.

Figure 11:
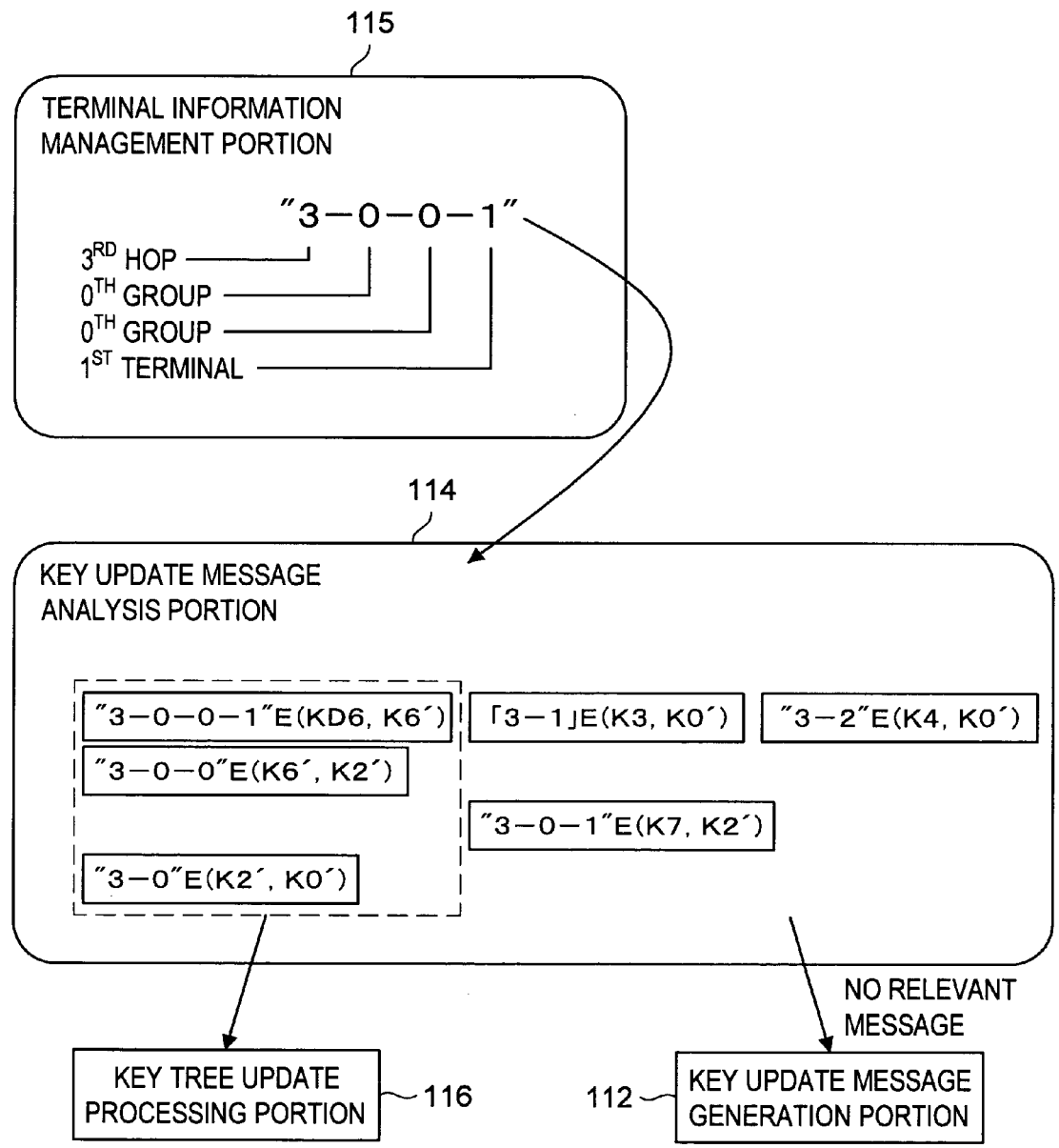
FIG. 11 is an explanatory diagram showing the operation of the communication terminal that has received the key update message according to the first embodiment of the present invention.
Figure 12:
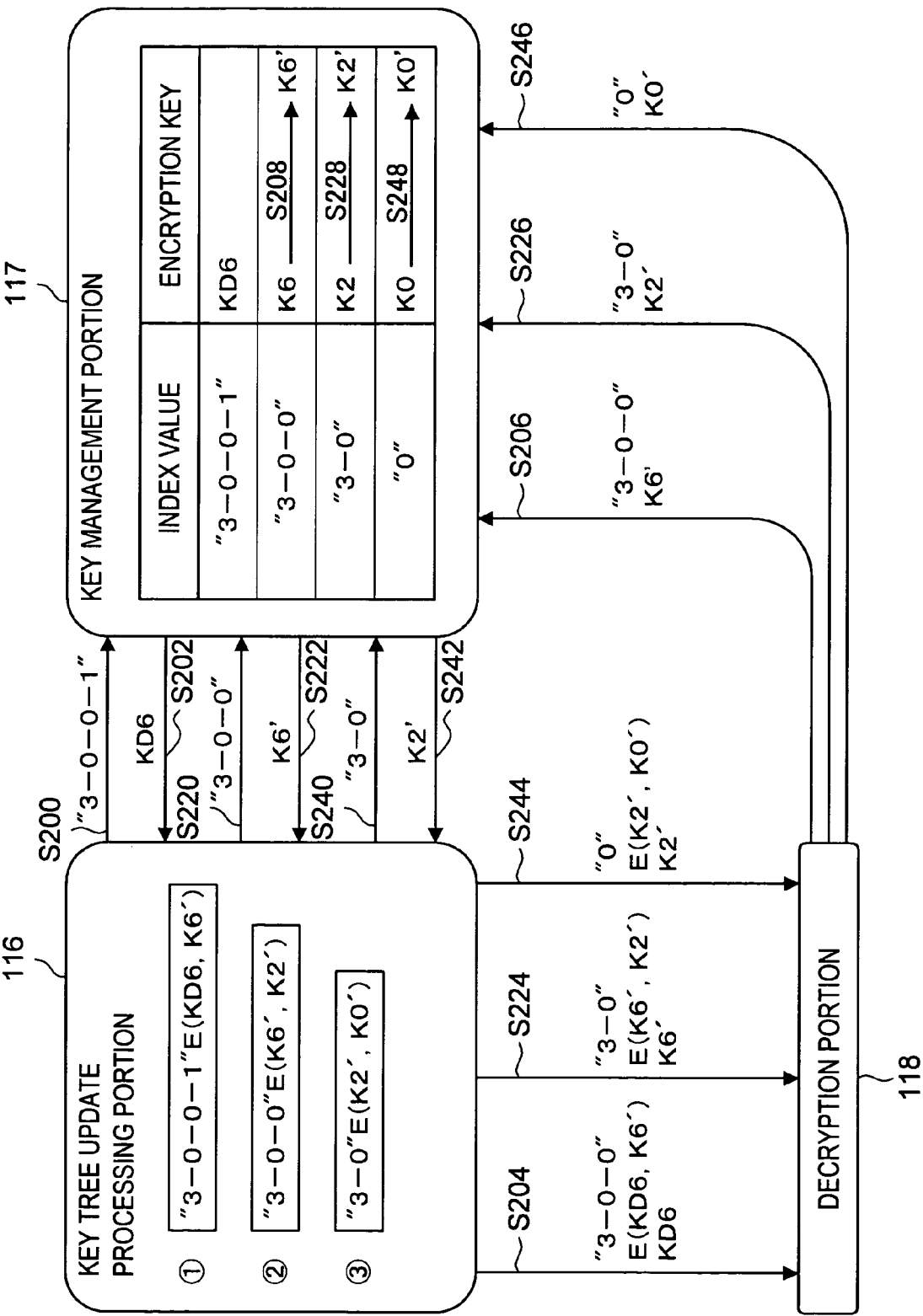
FIG. 12 is an explanatory diagram showing processing of an encryption update key and an index value supplied to a key tree update processing portion according to the first embodiment of the present invention.

Next, FIGS. 11 and 12 will be used to explain the operation that is performed by the communication terminal D6 when it receives a key update message during the key update operation that is performed when the communication terminal D5 is removed from the network in the multihop network model of FIG. 4

FIG. 11 is an explanatory diagram showing an operation performed by the communication terminal D6 to distinguish different types of information, namely, information needed to update the key of the communication terminal D6 itself, information that needs to be transferred to the next hop, and other information included in the key update message received by the communication terminal D6.

The key update message is sent to the key update message analysis portion 114 by the receiving portion 113. Then, the information "3-0-0-1" indicating the location in the key tree of the communication terminal D6 itself and the number of hops from the authentication management device 100 received from the terminal information management portion 115 is sent to the key update message analysis portion 114. Based on the information "3-0-0-1" about the communication terminal D6 itself received from the terminal information management portion 115, it can be recognized that the terminal has a location that is in the $3^{rd}$ hop from the authentication management device 100, and that the keys of the key tree that the communication terminal D6 itself holds and stores are "3-0-0-1", "3-0-0", "3-0", and "0 (network common key)". The key update message analysis portion 114 compares the index value of the encryption update key included in the key update message and the information "3-0-0-1" for the communication terminal D6 itself, and determines that the encryption update keys having the index values "3-0-0-1", "3-0-0", "3-0" are needed for updating the keys that the communication terminal D6 itself holds and stores. The key update message analysis portion 114 then sends the encryption update keys having the index values "3-0-0-1", "3-0-0", "3-0" to the key tree update processing portion 116.

Next, the other information included in the key update message is referred to, and given that the communication terminal D6 itself is located in the $3^{rd}$ hop from the authentication management device 100, the encryption update keys generated for communication terminal addresses in the $4^{th}$ hop or after are sent to the key update message generation portion 105. Since there are no communication terminals in the $4^{th}$ hop or after in the example of FIG. 11, there are no messages that are relevant in this case. However, in the case that such messages do exist, the key update message generation portion 105 links sets of received encryption update keys and index values, and generates a key update message that is transferred to the communication terminals in the next hop. The information that remains in the key update message received from the receiving portion 113 is information that is generated for communication terminal addresses, like the communication terminal D6 itself, that are located in the $3^{rd}$ hop from the authentication management device 100 but which have different parent terminals.

FIG. 12 is an explanatory diagram showing the processing of the encryption update keys and the index values received by the key tree update processing portion 116.

The key tree update processing portion 116 references the received encryption update keys and the index values and performs processing from the set that is located deepest in the key tree. Based on the results, the processing order is "3-0-0-1", "3-0-0", "3-0". The following processing is performed in order for each set.

The index values indicating the keys used to encrypt the encryption update keys are sent to the key management portion 117 (steps S200, S220, S240). The key management portion 117 then sends decryption keys that correspond to the index values to the key tree update processing portion 116 (steps S202, S222, S242).

The key tree update processing portion 116 sends the encryption update keys, the keys received from the key management portion 117, and respective index values indicating the locations that are one higher than the locations in the key tree indicated by the index values to the decryption portion 118 (steps S204, S224, S244). These index values indicate the locations in the key tree of the newly updated key. This is because the updated key is encrypted using the respective keys that are located one level deeper than each key in the key tree. The decryption portion 118 then decrypts the encryption update keys to obtain the newly updated keys.

The decryption portion 118 sends the newly updated keys and the index values as a set to the key management portion 117 (steps S206, S226, S246). Then, the key management portion 117 holds and stores the keys received from the decryption portion 118 as the key in the key tree that are indicated by the respective index values also received from the decryption portion 118 (steps S208, S228, S248).

As has been described above, in the first embodiment of the present invention, an authentication management device in a multihop network structure manages a key tree in which all communication terminals that share parent terminals are grouped. When each communication terminal relays the key update message, the communication terminal only extracts, from the information included in the key update message, the information generated for communication terminal addresses that have a larger hop number than the communication terminal itself, and transfers this information to the communication terminals in the next hop.

As compared to known key tree construction methods such as a binary tree, the key tree construction method according to the first embodiment of the present invention constructs subtrees in the multihop network in which all terminals that share parent terminals are formed in to groups, and then locates the subtrees beneath the root of the key tree. Accordingly, since the number of subtrees that branch from the root of the key tree increases as the total number of parent terminals increases, the number of communication terminals that one encryption update key applies to decreases. As a result, the size of the key update message becomes larger. On the other hand, the number of keys of the key tree that each communication terminal needs to hold and store in order to perform key update (the total number of the keys from the leaf to the root, including the keys on the route therebetween) depends only on the total number of child terminals connected to the given shared parent terminal, and does not depend on the total number of communication terminals participating in the network. In this way, there is a trade off between the size of the key update message and the number of keys held and stored by the communication terminals. However, if a key tree is constructed in accordance with the key tree construction method according to the first embodiment of the present invention, the information that needs to be sent to the next hop and the information that does not need to be sent to the next hop can be separated at each communication terminal that relays the key update message. Thus the size of the key update message can be reduced at each relay.

Hereinabove, as a result of constructing the key tree in accordance with the multihop network structure, the first embodiment of the present embodiment provides a system in which the number of keys that need to be held and stored by each communication terminal for key update only depends on the number of child terminals that are connected to a given shared parent terminal; and the traffic volume of the overall network related to delivery of the key update messages is reduced.

Second Embodiment

Figure 13:
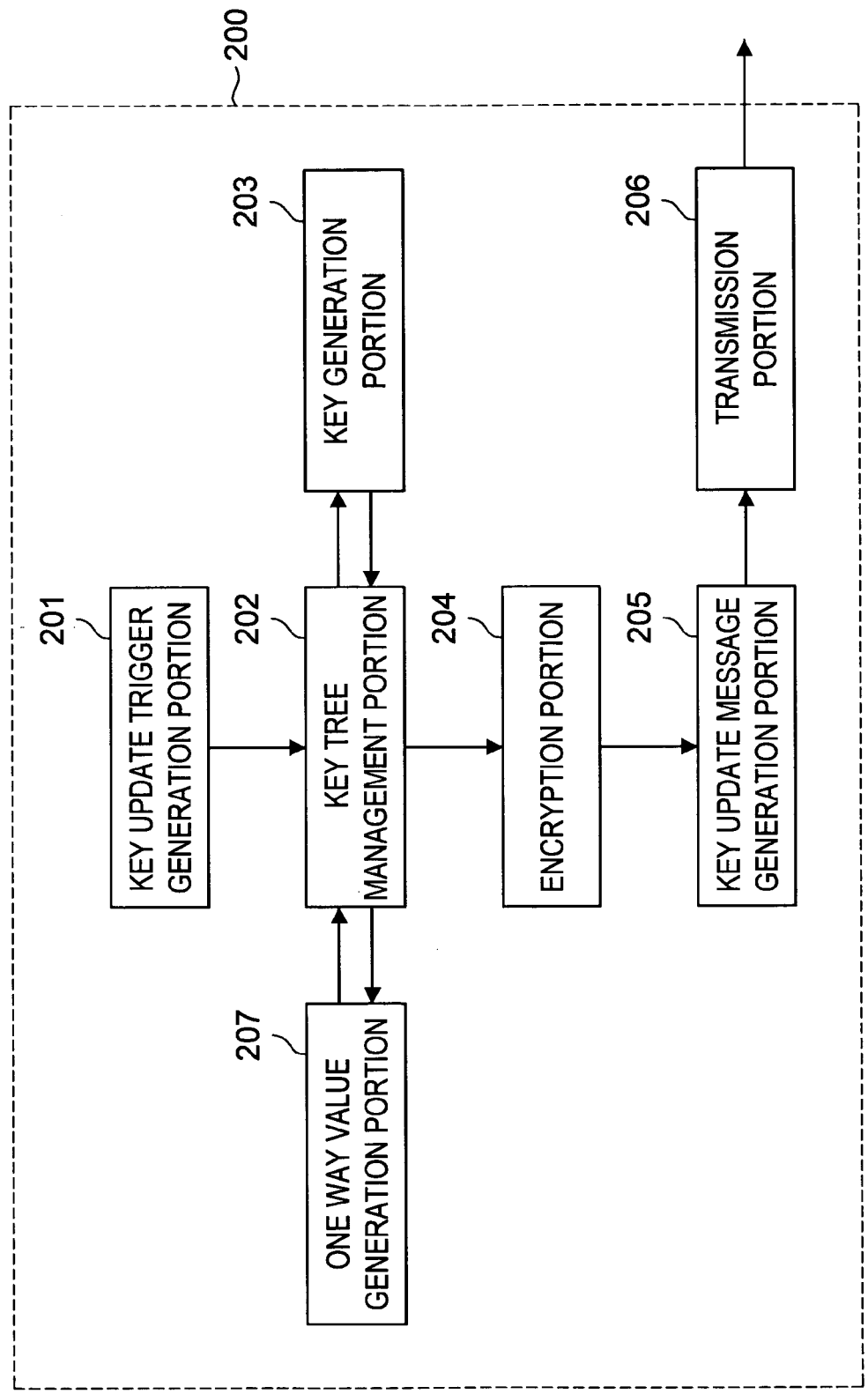
FIG. 13 is an explanatory diagram showing the internal structure of an authentication management device according to a second embodiment of the present invention.

FIG. 13 is an explanatory diagram showing the internal structure of an authentication management device according to a second embodiment of the present invention. As can be seen from FIG. 13, an authentication management device 200 according to the second embodiment of the invention is one example of a key management device, and includes a key update trigger generation portion 201, a key tree management portion 202, a key generation portion 203, an encryption portion 204, a key update message generation portion 205, a transmission portion 206, and a one way value generation portion 207. In the present embodiment as well, the key hierarchy is represented using a tree structure. All of the structural elements of the authentication management device 200 of the second embodiment, with the exception of the key tree management portion 202 and the one way value generation portion 207, operate in the same manner as the equivalent structural elements of the authentication management device 100 of the first embodiment. Accordingly, a detail explanation of these structural elements will be omitted here.

The key tree management portion 202 is an example of a key information management portion, and basically operates in the same way as the equivalent structural element described in the first embodiment. However, the points of difference relate to the generation method used for the update keys, and the number of keys that need to be notified to each communication terminal. In the second embodiment, among the keys that it has been determined need to be updated, the key located at the deepest position in the key tree is updated, and then the keys in the route from the deepest key to the root of the tree are generated using a one-way function.

The key tree management portion 202, like that in the first embodiment, sends a key request message to the key generation portion 203, receives new key information from the key generation portion 203, and then sets the key, from among the keys that need to be updated, as the key that is at the deepest location in the key tree. Next, when the key that is located one nearer to the root of the key tree than the just updated key is updated, the key tree management portion 202 sends the just updated key to the one way value generation portion 207. The one way value generation portion 207 then responds by sending a key back to the key tree management portion 202, which sets the key as the new key. Similarly, when each key located one nearer to the root of the key tree is updated, the output value of a one-way function input with the just updated key is set as the new key.

For example, when the communication terminal D5 is removed from the network in FIG. 5, the keys K6, K2 and K0 are updated with new keys K6', K2', and K0'. At this time, the relationships K2'=f (K6'), and K0'=f (K2') are established. Here, f (●) indicates the one-way function. Next, in the second embodiment, the number of keys that need to be notified to each communication terminal is different. In the case that a plurality of keys need to be notified to a given group of communication terminals, notification is only provided about the key that is located at the deepest location in the key tree among the keys. For example, in FIG. 5, when the communication terminal D5 is removed from the network, only the update of the key K6 to the key K6' is notified to the communication terminal D6. In addition, only the update of the key K2 to the key K2' is notified to the communication terminals D7, D8. The other communication terminals are notified that the key K0 is being updated to the key K0'.

The one way value generation portion 207 applies the one-way function to the bit string received from the key tree management portion 202, and generates a bit string with a specified length. The generated bit string is sent to the key tree management portion 202. It is essential that the one-way function stored by the one way value generation portion 207 matches the one-way function stored by the communication terminals, as will be described later. Note that, the one-way function used is not particularly specified, but it is necessary to use a function that is safe when the present invention is used. For example, a one-way function, a random number generator or the like using a block cipher like cipher-hash function Secure Hash Algorithm-1, AES, or the like may be used.

Figure 14:
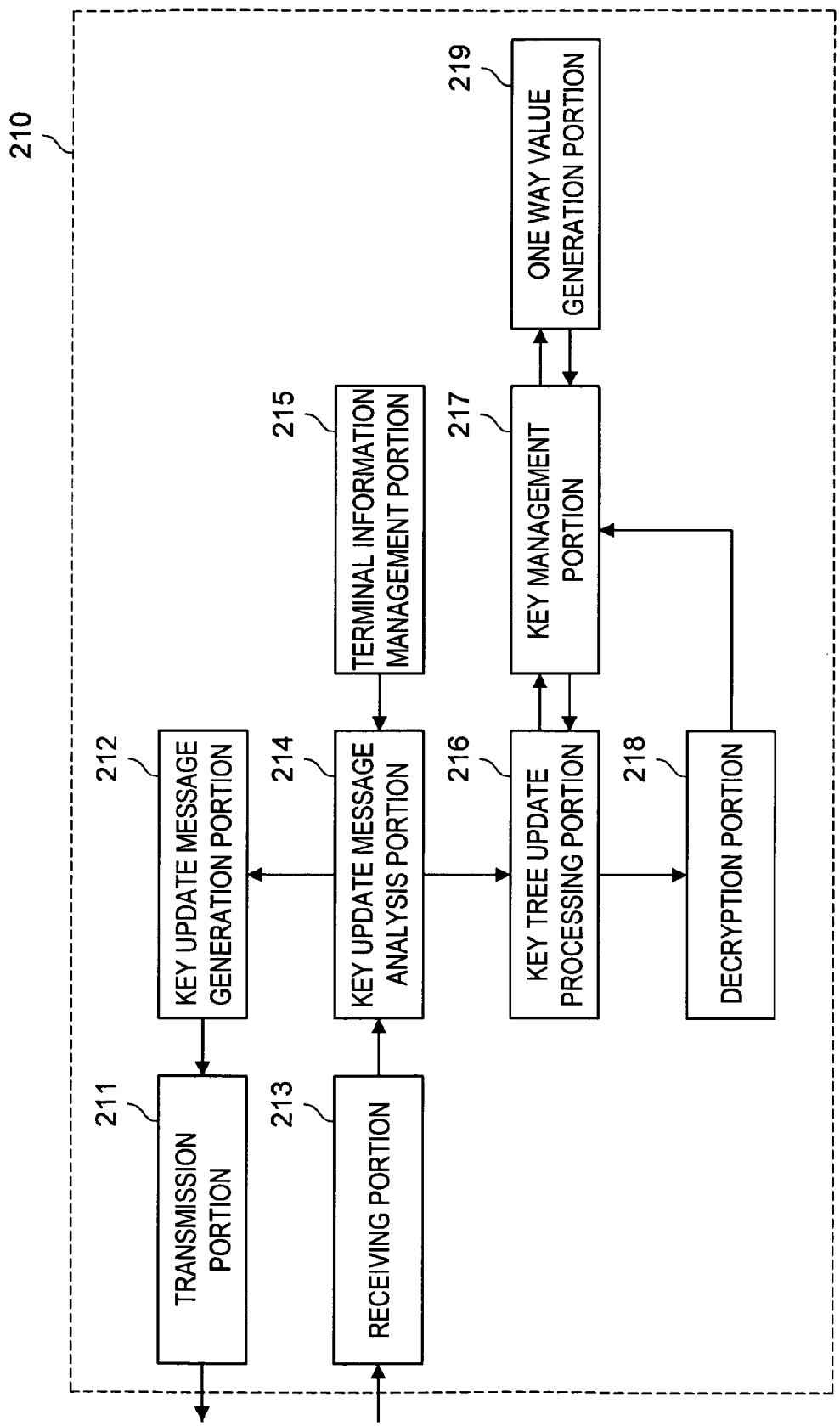
FIG. 14 is an explanatory diagram showing the internal structure of a communication terminal according to the second embodiment of the present invention.

FIG. 14 is an explanatory diagram showing the internal structure of a communication terminal according to the second embodiment of the present invention. The communication terminal according to the second embodiment of the invention includes a transmission portion 211, a key update message generation portion 212, a receiving portion 213, a key update message analysis portion 214, a terminal information management portion 215, a key tree update processing portion 216, a key management portion 217, a decryption portion 218, and a one way value generation portion 219. All of the structural elements, with the exception of the key tree update processing portion 216, the key management portion 217, and the one way value generation portion 219, operate in the same manner as the equivalent structural members of the communication terminal in the first embodiment, and thus a detailed explanation of these structural elements will be omitted. Here, the key tree update processing portion 216 and the key management portion 217 that operate in a different manner to the first embodiment, and the one way value generation portion 219 that is a new structural element will be described.

The key tree update processing portion 216 basically operates in the same manner as the equivalent structural element of the first embodiment. The points of difference from the first embodiment relate to that only one encrypted update key is received from the key update message analysis portion 214, and that the one encrypted update key is received as a set with the index value of the encrypted update key.

The key management portion 217 basically operates in the same manner as the equivalent structural element of the first embodiment. However, the point of different from the first embodiment is that the key received from the decryption portion 218 is managed as a new key at the location in the key tree indicated by the index value. Based on the location of this new key in the key tree, the keys in the tree on the route to the root are derived using the one way value generation portion 219. The key management portion 217 receives the new key from the decryption portion 218, and manages the key as the new key for the location in the key tree indicated by the index value. Next, in the case that the index value corresponding to the key is not the root of the key tree, the new key presently received by the decryption portion 218 is sent to the one way value generation portion 219. Then, when the key management portion 217 receives a key from the one way value generation portion 219, this key is managed as the new key at the location one nearer the root of the tree from the location in the key tree indicated by the index value of the key sent to the one way value generation portion 219. This operation is repeated for all the keys up to the root of the tree, thereby allowing the given terminal to obtain the updated keys that exist in the route in the key tree from the leaf that corresponds to the terminal itself to the root The one way value generation portion 219 applies the one-way function to the bit string received from the key management portion 217, and generates a bit string with a specified length. The generated bit string is sent to the key management portion 217. It is essential that the one-way function stored by the one way value generation portion 219 matches the one-way function stored by the authentication management device 200 described above.

Figure 15:
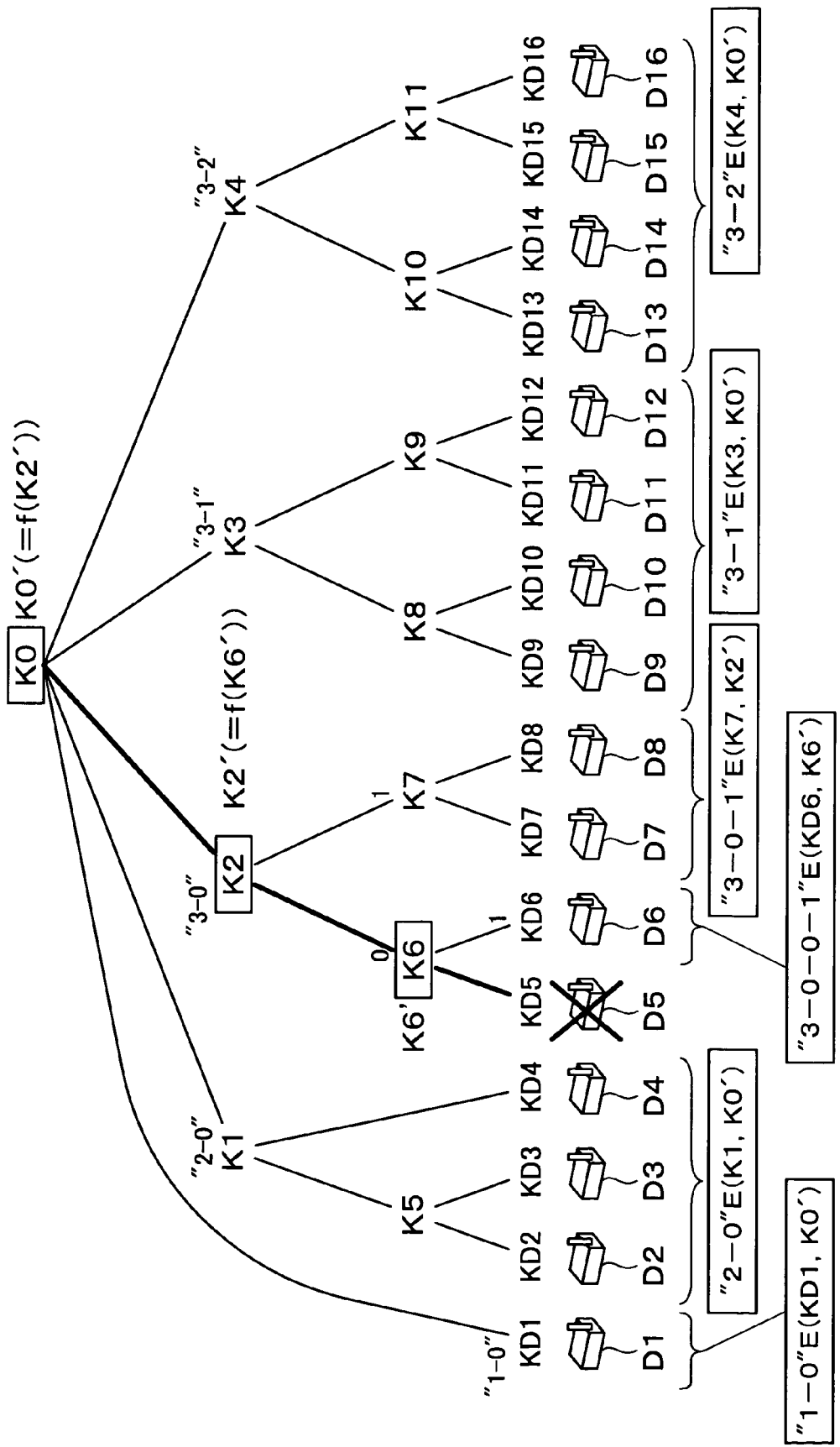
FIG. 15 is an explanatory diagram showing the operation of the authentication management device when a communication terminal is removed from a network according to the second embodiment of the present invention.
Figure 16:
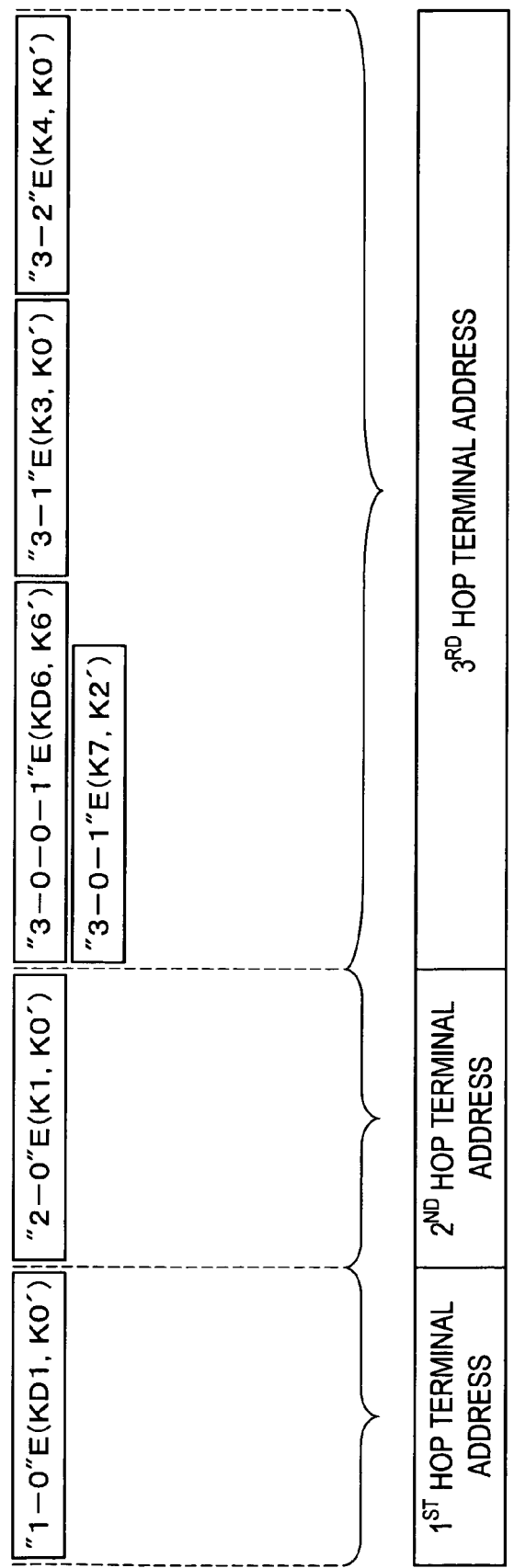
FIG. 16 is an explanatory diagram showing an example of a key update message according to the second embodiment of the present invention.

Next, FIGS. 15 and 16 will be used to explain the key update system according to the second embodiment of the present invention. FIG. 15 is an explanatory diagram showing the operation of the authentication management device 200 when the communication terminal D5 is removed in the multihop network model shown in FIG. 4. The internal structure of the communication terminals D1 to D16 is the same as that of the communication terminal 210.

In order to remove the communication terminal D5 from the network, first, the key update trigger generation portion 201 generates a key update start message for removing the communication terminal D5 from the network and sends this message to the key tree management portion 202.

The key tree management portion 202 updates the key K6, which is at the deepest location among the keys that exist in the route from the leaf that corresponds to the communication terminal D5 to the root of the key tree, with a random value K6' that is generated by the key generation portion 203. Then, the updated key K6' is sent to the one way value generation portion 207, which responds by sending a random value f (K6') to the key tree management portion 202. The key tree management portion 202 uses the value f (K6') to set the key K2 that is located one level higher in the key tree to K2'. Similarly, all of the keys in the route from to the root of the key tree are updated using random values generated by the one way value generation portion 207.

Next, in the case that there are a plurality of keys that need to be notified to a given group of communication terminals, notification is provided about only the key among the keys that is located at the deepest location in the key tree. In the example of FIG. 15, the communication terminal D6 is only notified about the update of key K6 to key K6', the communication terminals D7, D8 are only notified about the update of key K2 to key K2', and the other communication terminals are notified about the update of key K0 to key K0'.

The key update message generation portion 205 links the one or more sets of encryption update keys and the index values received from the encryption portion 204, and generates the key update message. The key update message generation portion 205 then sends the key update message to the communication terminal via the transmission portion 206. FIG. 16 is an explanatory diagram showing an example of the generated key update message. Like the key update message in the first embodiment, the key update message is an example in which key update messages for a $1^{st}$ hop terminal address, a $2^{nd}$ hop terminal address, and a $3^{rd}$ hop terminal address form a single set.

Figure 17:
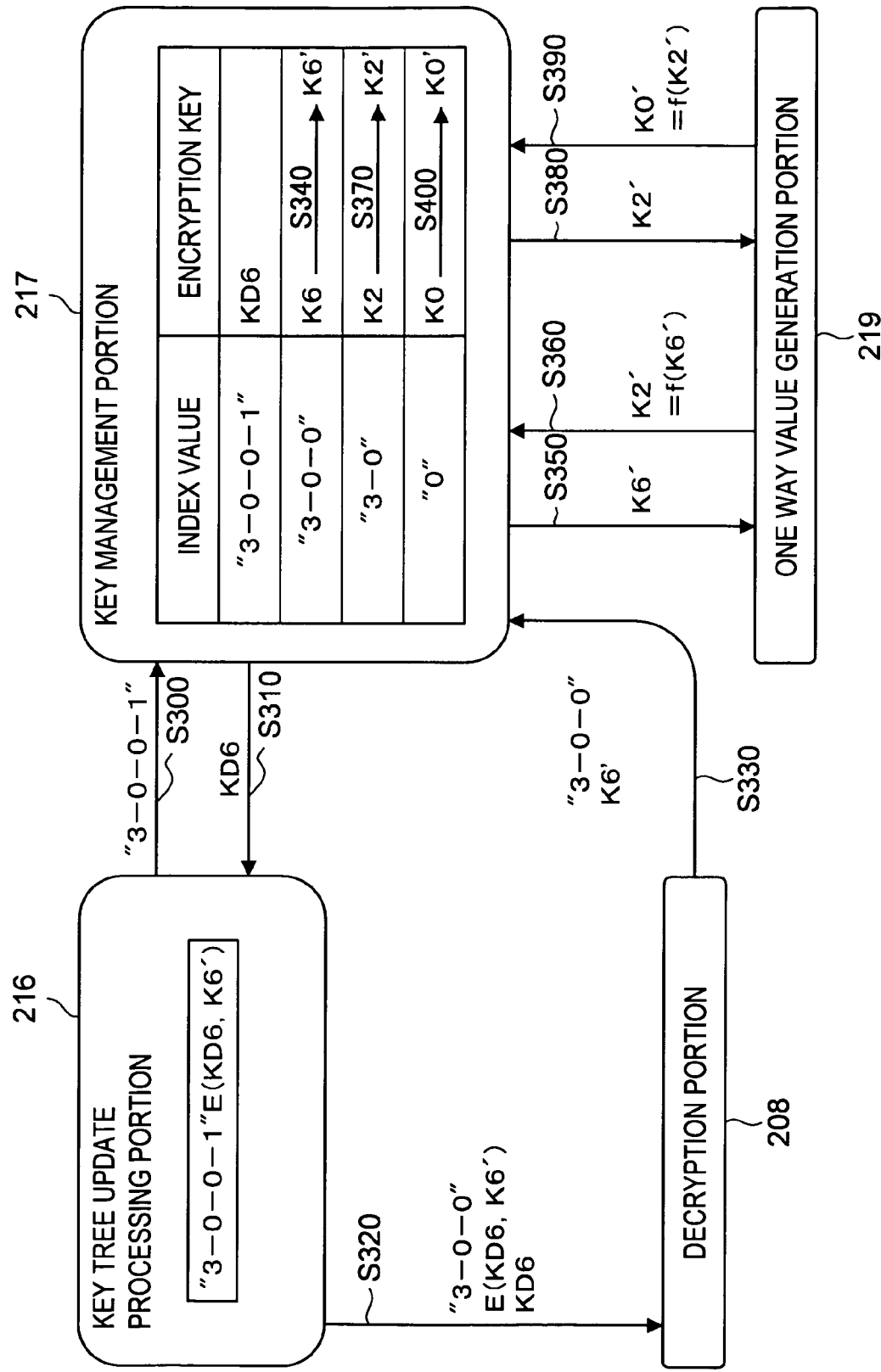
FIG. 17 is an explanatory diagram showing a procedure up until a key managed by a key management portion is updated according to the second embodiment of the present invention.

FIG. 17 is an explanatory diagram showing a procedure up until the keys managed by the key management portion 217 are updated based on the encryption update keys and the index values received by the key tree update processing portion 216. The figure shows an example of the operation that is performed, as in the first embodiment, by the communication terminal D6 when it receives a key update message during the key update operation that is performed when the communication terminal D5 is removed from the network in the multihop network model of FIG. 4.

The key tree update processing portion 216 sends the index value indicating the key used when encrypting the update key to the key management portion 217 (step S300), and receives the decryption key (step S310) that corresponds to the index value. In the present embodiment, the index value "3-0-0-1" is sent to the key management portion 217, and the corresponding key KD6 is received from the key management portion 217.

The key tree update processing portion 216 sends the encryption update key, the key received from the key management portion 217, and the index value indicating a location one above the location of the key indicated by the index value to the decryption portion 218 (step S320). This index value indicates the location of the newly updated key in the key tree. This is because the updated key is encrypted using the key that is located one level deeper in the key tree from the updated key. The decryption portion 218 decrypts the encrypted updated key, and obtains the newly updated key.

The decryption portion 218 makes a set of the newly updated key and the index value and sends it to the key management portion 217 (step S330). In the present embodiment, the newly updated key K6' and the index value "3-0-0" are made into a set, and sent to the key management portion 217. The key management portion 217 holds and stores the key received from the decryption portion 218 as the key in the key tree indicated by the index value also received from the decryption portion 218 (step S340). In the present embodiment, the key corresponding to the index value "3-0-0" is updated from K6 to K6' and held and stored.

The key management portion 217 uses the one way value generation portion 219 to derive and update the keys from the location in the key tree of the updated key to the root of the key tree, including all the keys in the route thereto. First, the updated key K6' is supplied to the one way value generation portion 219 (step S350). The one way value generation portion 219 takes K6' as an input value for f (K6') and sends it back as K2' to the key management portion 217 (step S360). The key management portion 217 updates the key that corresponds to the index value "3-0" from K2 to the key K2' sent from the one way value generation portion 219 (step S370) and holds and stores the key K2'. Then, the updated key K2' is sent to the one way value generation portion 219 (step S380). The one way value generation portion 219 takes K2' as an input value for f (K2') and sends it back as K0' to the key management portion 217 (step S390). The key management portion 217 updates the key that corresponds to the index value "0" from K0 to the key K0' sent from the one way value generation portion 219 (step S400) and holds and stores the key K0'. In this manner, it is possible to use the one way value generation portion 219 to derive and update the keys that are in the route in the key tree to the root.

In the above described second embodiment of the present invention as well, the key tree is constructed in accordance with the multihop network structure thereby making it possible to provide a system in which the number of keys for key update that need to be held and stored by each communication terminal only depends on the number of child terminals that are connected to a given shared parent terminal; and the traffic volume of the overall network related to delivery of the key update messages is reduced.

Third Embodiment

In a third embodiment, terminals that act as parents in the multihop network manage the information of the child terminals that are connected via each given parent terminal, thereby allowing the size of the key update message to be reduced. The explanation of the third embodiment will be fundamentally based on the explanation of the second embodiment. An authentication management device 300 according to the third embodiment of the invention is an example of a key management device. Since the structural elements of the authentication management device 300 are the same as those of the authentication management device 200 according to the second embodiment of the invention, the explanation will be omitted here. In the present embodiment as well, the key hierarchy will be represented using a tree structure.

Figure 18:
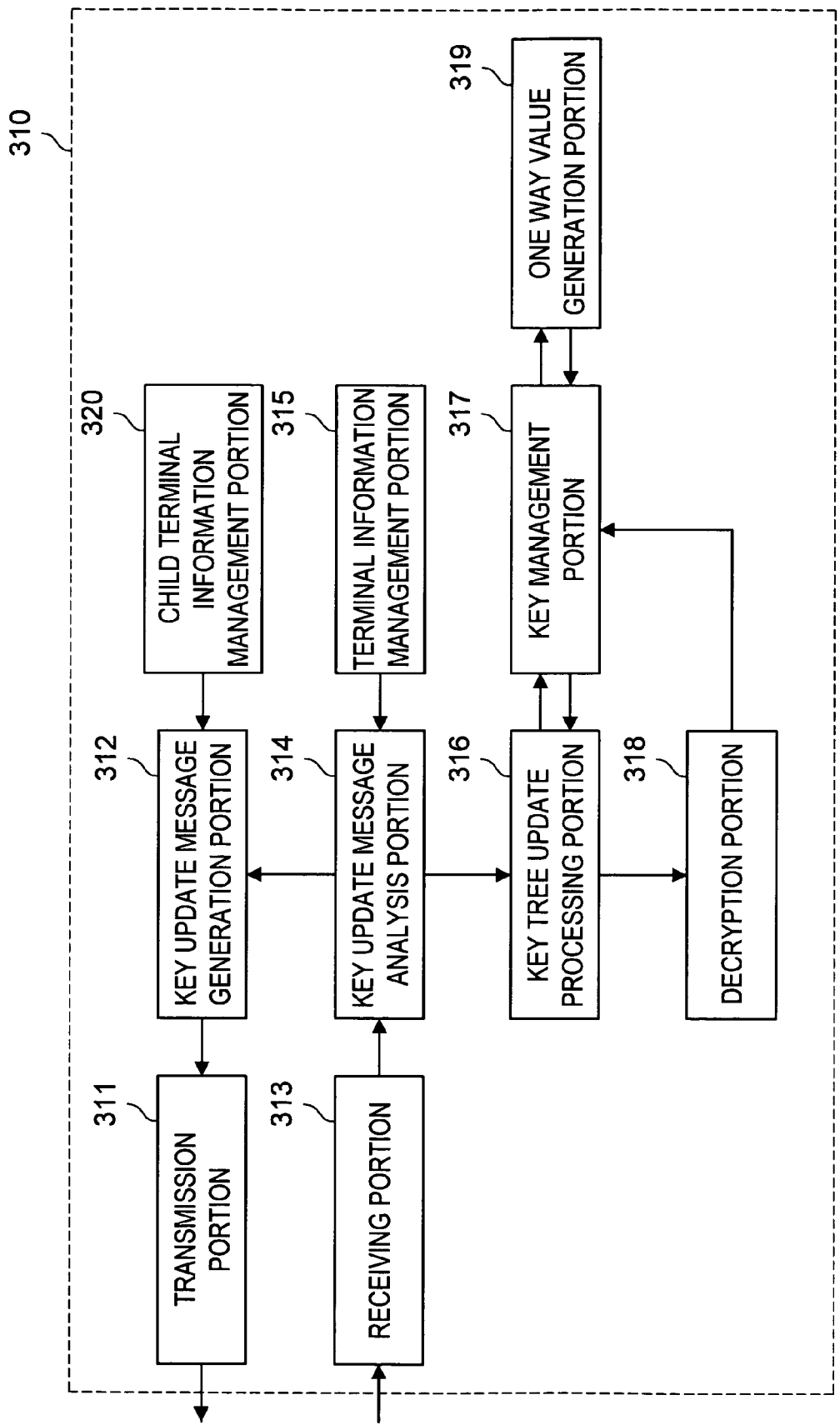
FIG. 18 is an explanatory diagram showing the internal structure of a communication terminal according to a third embodiment of the present invention.

FIG. 18 is an explanatory diagram showing the internal structure of a communication terminal according to the third embodiment of the present invention. As can be seen from FIG. 18, a communication terminal 310 according to the third embodiment of the invention includes a transmission portion 311, a key update message generation portion 312, a receiving portion 313, a key update message analysis portion 314, a terminal information management portion 315, a key tree update processing portion 316, a key management portion 317, a decryption portion 318, a one way value generation portion 319, and a child terminal information management portion 320.

Amongst these structural elements, only the key update message generation portion 312 that operates in a slightly different manner to that of the communication terminal according to the second embodiment of the invention, and the operation of the child terminal information management portion 320 that is an entirely new internal structural element will be described.

The child terminal information management portion 320 manages information related to which subtrees in the key tree the terminals in the next hops from its own communication terminal belong to, such as information related to the child terminals that have the communication terminal 310 as a parent terminal, and other child terminals that have its own child terminals as parent terminals. The representation method used for managing the information about which subtrees terminals belong to is specified in advance with the authentication management device 300. For example, in the key tree shown in FIG. 5, the information managed by the communication terminal D2 may be represented using an index value that says "Child terminal group level: "3-0" ($0^{th}$ group located in the $3^{rd}$ hop)". The child terminal information management portion 320 sends the information that is managed by its own communication terminal to the key update message generation portion 312. The information managed by the child terminal information management portion 320 is synchronized with the information of the key tree managed by the authentication management device 300.

The key update message generation portion 312 basically operates in the same manner as the equivalent structural element of the first embodiment. However, the points of difference from the first embodiment relate to that: the key update message generation portion 312 receives information that indicates which subtrees in the key tree the terminals in the next hops from its own communication terminal belong to from the child terminal information management portion 320; and that the key update message generation portion 312 uses the received information as a basis for generating the key update message. The key update message generation portion 312 determines whether the set of the encryption update key and the index value received from the key update message analysis portion 314 is information that needs to be sent to the next hop based on the information received from the child terminal information management portion 320. In the case that it is determined that the information needs to be sent to the next hop, a set of the encryption update key and the index value received from the key update message analysis portion 314 is included in the key update message. In the case that it is determined that the information does not need to be sent to the next hop, the set of the encryption update key and the index value received from the key update message analysis portion 314 is not included in the key update message.

For example, if the sets of index values and encryption update keys ""3-0-0-1" E (KD6, K6')", ""3-0-1" E (K7, K2')", "3-1" E (K3, K0')", and ""3-2" E (K4, K0')" sent from the key update message analysis portion 314 are received by the communication terminal D2 shown in FIG. 5, and the child terminal information management portion 320 sends the index value ""3-0"", the key update message is generated using the information generated for the address of the group that the child terminals of the communication terminal D2 belong to, namely, ""3-0-0-1" E (KD6, K6')", and ""3-0-1" E (K7, K2')".

Figure 19:
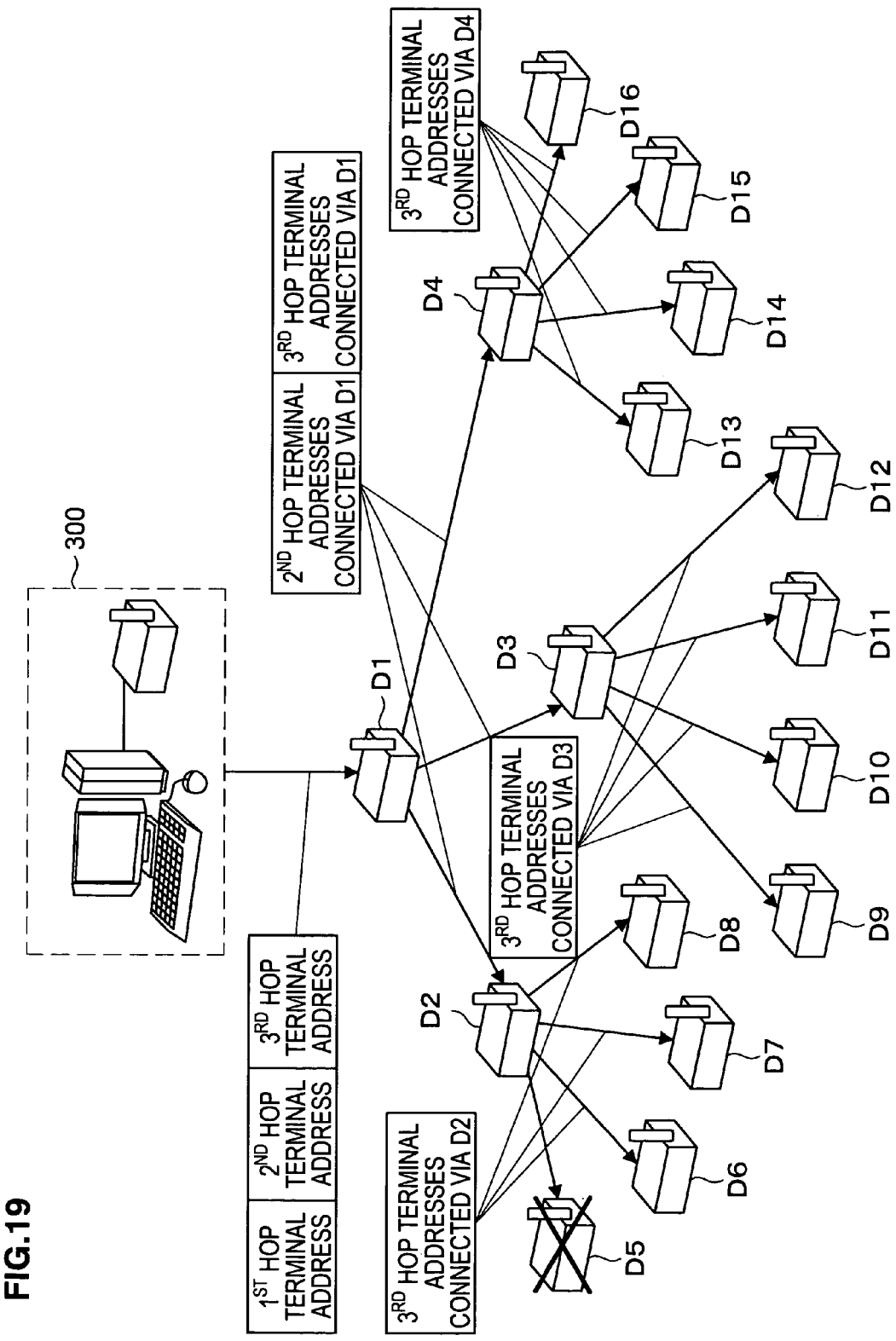
FIG. 19 is an explanatory diagram showing an outline of a relay method of a communication terminal that has received a key update message according to the third embodiment of the present invention.
Figure 20:
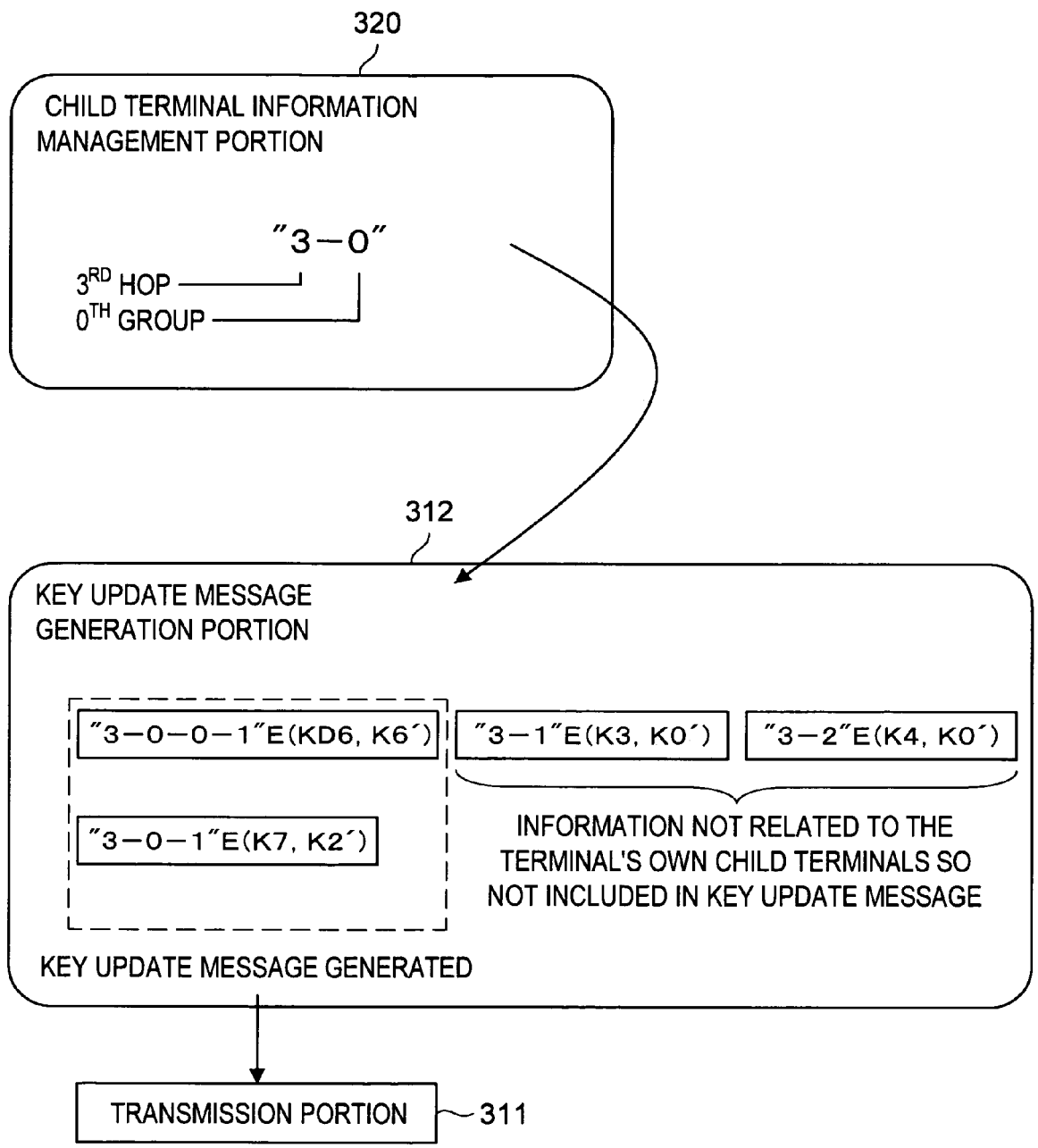
FIG. 20 is an explanatory diagram showing a key update message generation procedure that is performed when a communication terminal is removed from a network according to the third embodiment of the present invention.
Figure 21:
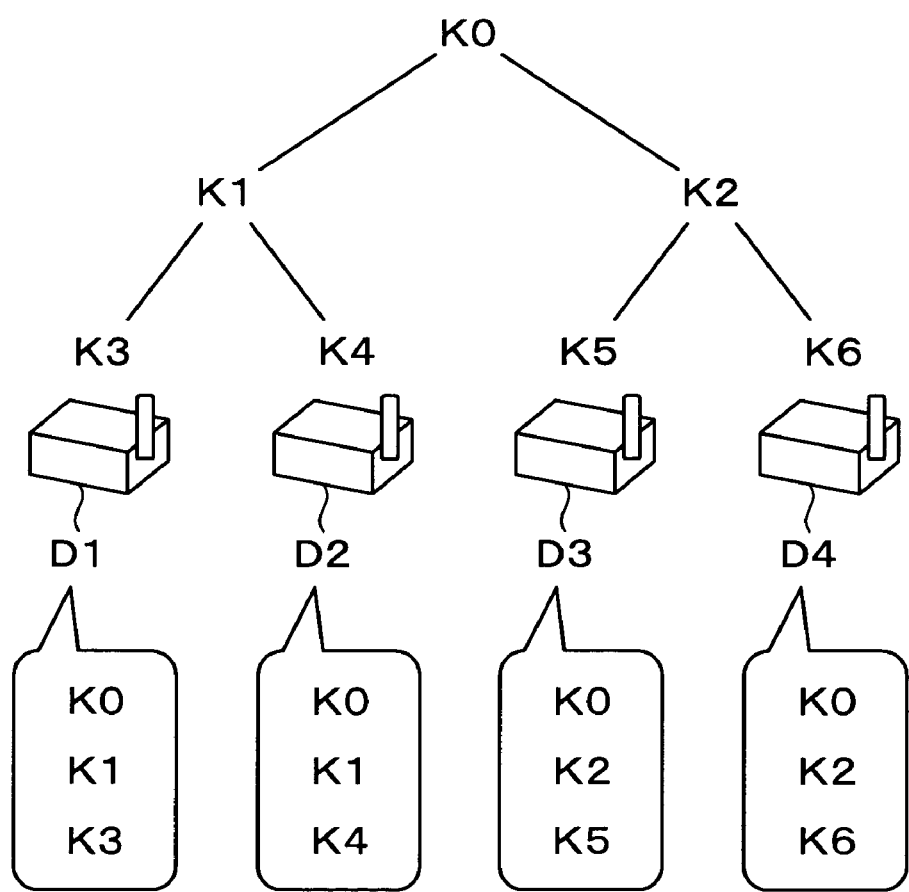
FIG. 21 is an explanatory diagram showing a LKH key distribution protocol.

Next, FIGS. 19 to 20 will be used to explain the key update method of the key update system according to the third embodiment of the invention.

FIG. 19 is an explanatory diagram showing an outline of how a communication terminal that has received a key update message relays the key update message to the next hop communication terminals. The communication terminals D1 to D16 shown in FIG. 19 have the same internal structure as the communication terminal 310. As can be seen from FIG. 19, the communication terminal that has received the key update message is able to recognize the number of hops from the authentication management device 300 of the communication terminal address that the set of one or more encrypted update keys and index values included in the key update message is generated for.

As a result of the communication terminal recognizing in advance which index values indicate the groups of child terminals connected via itself, the communication terminal is able to recognize which child terminal group addresses connected via itself the sets of one or more encryption update keys and index values included in the key update message are generated for. In the present embodiment, each communication terminal that receives the key update message references the information related to the number of hops of its own location from the authentication management device 300, the information related to the group of child terminals that exist in the next hops and that are connected via itself, and the index values included in the key update message, and only transfers the information generated for communication terminal addresses in the next hops connected via itself as the key update message.

In FIG. 19, the communication terminal D1 receives key update messages for terminal addresses in the $1^{st}$ hop, the $2^{nd}$ hop, and the $3^{rd}$ hop from the authentication management device 300. The child terminal information management portion 320 of the communication terminal D1 confirms that the communication terminal D1 is a communication terminal in the $1^{st}$ hop from the authentication management device 300, and transfers the key update message for terminal addresses in the $2^{nd}$ hop connected via the communication terminal D1, namely, the communication terminals D2, D3 and D4 that are child terminals of the communication terminal D1, and the key update message for terminal addresses in the $3^{rd}$ hop connected via the communication terminal D1. The communication terminal D2 receives the key update message for terminal addresses in the $2^{nd}$ hop connected via the communication terminal D1, and the key update message for terminal addresses in the $3^{rd}$ hop connected via the communication terminal D1. The child terminal information management portion 320 of the communication terminal D2 confirms that the communication terminal D2 is a communication terminal in the $2^{nd}$ hop from the authentication management device 300, and transfers the key update message for terminal addresses in the $3^{rd}$ hop connected via the communication terminal D2 to the communication terminals D5, D6, D7 and D8 that are child terminals of the communication terminal D2.

FIG. 20 is an explanatory diagram showing a key update message generation procedure that is performed by the communication terminal D2 when the communication terminal D5 is removed from the network in the multihop network model shown in FIG. 4.

The key update message generation portion 312 of the communication terminal D2 receives just the information for communication terminal addresses in the next hops from the key update message analysis portion 314. In addition, the key update message generation portion 312 also receives information from the child terminal information management portion 320 related to which subtrees in the key tree the terminals in the next hops from itself belong to.

The key update message generation portion 312 receives the index value "3-0" for the child terminal group that is in the next hop connected via itself, and the index value that forms a set with the encryption updated key sent by the key update message analysis portion 314, and compares the index values to determine that the information that needs to be transferred via its own communication terminal to the next hop is the encryption updated keys that have the index values "3-0-0-1" and "3-0-1".

Then, the key update message generation portion 312 generates a key update message that only includes the information that needs to be transferred to the next hop, and sends the key update message to the transmission portion 311. The transmission portion 311 sends the key update message to the communication terminals that are located in the next hop from the communication terminal D2.

As explained above, a main feature of the third embodiment of the invention, as compared to the first and the second embodiments, is that terminals that act as parents in the multihop network manage the information about child terminals that are connected via a given parent terminal. As a result, it is possible to determine which information among the received key update message is information that needs to be transferred to the next hop terminals, and only this information is used to generate the key update message that is sent to the next hop terminals.

Accordingly, as compared to the first and the second embodiments in which only key update messages for terminal addresses in the next hops are sent based on recognition of the number of hops of the given communication terminal from the authentication management device, in the third embodiment any given communication terminal manages the information of the child terminals connected via itself. Since any given communication terminal only sends the key update messages for terminal address in the next hops connected via itself, the size of the key update message can be reduced. Thus, as compared to the first and the second embodiments, the third embodiment is effective in further reducing the traffic volume of the overall network related to delivery of the key update messages.

Hereinabove, exemplary embodiments of the present invention have been described with reference to the appended drawings. However, the present invention is not limited to these embodiments. As will be obvious to a person skilled in the art, the invention permits of various modifications and changes without departing from the scope of the claims. Such modifications and changes are understood to come within the scope of the present invention.

For example, in the present invention, groups are formed in the multihop network of communication terminals that have the same parent terminal in order to construct subtrees. However, the subtree construction method used within the groups is not particularly limited. A main feature of the present invention is that communication terminals that have the same parent terminal are formed in to groups to form subtrees, and the formed subtrees are assigned locations in the key tree.

In addition, the third embodiment of the present invention describes an example that is a development based on the second embodiment. However, the third embodiment may be applied as a development of the first embodiment. In other words, the communication terminals may include a child terminal information management portion and may not include a one way value generation portion.

Furthermore, the third embodiment of the present invention describes an example in which each communication terminal holds the information of the child terminals connected via itself, and uses this information as a basis for extracting only the key update message necessary for its own child terminals, and relays this information. However, the information about the child terminals connected by each communication terminal may be held by the authentication management device. In this case, the authentication management device generates necessary key update messages for first hop terminals connected to itself, and for each of the communication terminals connected thereafter, and sends the key update messages to the relevant communication terminals.

Moreover, the network model shown in FIG. 4 used to explain the present invention illustrates an example in which the authentication management device broadcasts the key update messages, and each communication terminal relays the broadcast of the key update messages. However, the invention is not particularly limited to this structure, and various different patterns or a combination of such patterns may be used. For example, the authentication management device may generate only the key update message necessary for a given communication terminal, and send this key update message by unicast to the given communication terminal. Alternatively, the authentication management device may only generate the key update messages necessary for a group of child terminals connected to a given shared parent terminal, and may request the shared parent terminal to send these key update messages to the group of child terminals.

The present invention may be applied as a key information construction method, a key update system, a key management device, and a communication terminal for a multihop network.

What is claimed is:

1. A key update system for a multihop network system comprising a key management device that manages keys, and a plurality of communication terminals that obtain the keys,
    wherein the multihop network has a hierarchical structure in which the communication terminals communicate with the key management device via a tree arrangement in which a first one of the communication terminals at a first hop from the key management device is a first parent terminal, a second one of the communication terminals at a second hop from the key management device is a second parent terminal that communicates with the first parent terminal, the second parent terminal and all other communication terminals at the second hop that communicate with the first parent terminal form a first group having a first common group key, and all communication terminals at a third hop from the key management device that communicate with the second parent terminal form a second group having a second common group key,
    wherein the hierarchical structure of the multihop network is such that at least one of the first and second groups includes three or more communication terminals,
    wherein the key management device comprises:
        a key information management portion that constructs key information having a hierarchical structure that accords with the hierarchical structure of the multihop network and manages the key information;
        an encryption portion that encrypts the keys using encryption keys included in the key information; and a transmission portion that transmits the keys after encryption by the encryption portion, and wherein each of the communication terminals comprises:
- a receiving portion that receives the encrypted keys;
- a key management portion that manages, among the keys included in the key information, the keys that need to be held and stored by any given one of the communication terminals; and
- a decryption portion that decrypts the encrypted keys.

2. The key update system according to claim 1, wherein the key management device further comprises a key generation portion that generates keys.

3. The key update system according to claim 1, wherein the key management device further comprises a one way value generation portion that has a one-way function.

4. The key update system according to claim 1, wherein each of the communication terminals further comprises a transmission portion that transmits the encrypted keys.

5. The key update system according to claim 1, wherein each of the communication terminals further comprises a key update message analysis portion that analyzes a destination of each of the encrypted keys.

6. The key update system according to claim 1, wherein each of the communication terminals further comprises a key update message generation portion that generates a message for sending just the encrypted keys that have destinations among the communication terminals in the next hop or after of the multihop network.

7. The key update system according to claim 1, wherein each of the communication terminals further comprises a one way value generation portion that has a one-way function.

8. A key management device that manages key information that has a hierarchical structure that accords with a hierarchical structure of a multihop network that includes a plurality of communication terminals, the key management device comprising:
- a key information management portion that constructs and manages key information;
- an encryption portion that encrypts keys using encryption keys included in the key information; and
- a transmission portion that transmits the encrypted keys encrypted by the encryption portion, wherein the communication terminals communicate with the key management device via a tree arrangement in which a first one of the communication terminals at a first hop from the key management device is a first parent terminal, a second one of the communication terminals at a second hop from the key management device is a second parent terminal that communicates with the first parent terminal, the second parent terminal and all other communication terminals at the second hop that communicate with the first parent terminal form a first group having a first common group key, and all communication terminals at a third hop from the key management device that communicate with the second parent terminal form a second group having a second common group key, and wherein the hierarchical structure of the multihop network is such that at least one of the first and second groups includes three or more communication terminals.

9. The key management device according to claim 8, further comprising:
- a key generation portion that generates keys.

10. The key management device according to claim 8, further comprising:
- a one way value generation portion that has a one-way function.

11. A particular communication terminal that obtains encrypted keys that are encrypted by a key management device using keys included in key information that has a hierarchical structure that accords with a structure of a multihop network that includes the particular communication terminal and a plurality of additional communication terminals, the particular terminal comprising:
- a receiving portion that receives the encrypted keys;
- a key management portion that manages, among the keys included in the key information, the keys that need to be held and stored by the particular communication terminal; and
- a decryption portion that decrypts the encrypted keys, wherein the communication terminals communicate with the key management device via a tree arrangement in which a first one of the communication terminals at a first hop from the key management device is a first parent terminal, a second one of the communication terminals at a second hop from the key management device is a second parent terminal that communicates with the first parent terminal, the second parent terminal and all other communication terminals at the second hop that communicate with the first parent terminal form a first group having a first common group key, and all communication terminals at a third hop from the key management device that communicate with the second parent terminal form a second group having a second common group key, and wherein the hierarchical structure of the multihop network is such that at least one of the first and second groups includes three or more communication terminals.

12. The particular communication terminal according to claim 11, further comprising:
- a transmission portion that transmits the encrypted keys.

13. The particular communication terminal according to claim 11, further comprising:
- a key update message analysis portion that analyzes the destination of each of the encrypted keys.

14. The particular communication terminal according to any one of claims 11 to 13, further comprising:
- a key update message generation portion that generates a message for sending just the encrypted keys that have destinations among the communication terminals in the next hop or after of the multihop network.

15. The particular communication terminal according to claim 11, further comprising:
- a one way value generation portion that has a one-way function.

16. A key information construction method comprising the steps of:
- grouping, from among communication terminals in a multihop network that have terminal devices functioning as parents, those communication terminals that have the same terminal device functioning as a parent, the grouping step being conducted by a key management device and resulting in at least one group that includes three or more communication terminals; and
- constructing key information having a hierarchical structure, wherein the communication terminals communicate with the key management device via a tree arrangement in which a first one of the communication terminals at a first hop from the key management device is a first parent terminal and a second one of the communication terminals at a second hop from the key management device is a second parent terminal that communicates with the first parent terminal, and wherein the grouping step is conducted so that the second parent terminal and all other communication terminals at the second hop that communicate with the first parent terminal form a group having a common group key, and all communication terminals at a third hop from the key management device that communicate with the second parent terminal form another group having another common group key.

17. The key information construction method according to claim 16, further comprising:

establishing, in the case that any given one of the communication terminals does not share a parent terminal with any other one of the communication terminals, a new group that has the given communication terminal as an initial member; and constructing new key information that has a hierarchical structure.

* * * * *